(12) United States Patent
Moukahal et al.

(10) Patent No.: US 11,366,748 B1
(45) Date of Patent: Jun. 21, 2022

(54) FUZZY TESTING A SOFTWARE SYSTEM

(71) Applicant: IRDETO B.V., Hoofddorp (NL)

(72) Inventors: Lama Moukahal, Hoofddorp (NL); Mohammad Zulkernine, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 17/191,791

(22) Filed: Mar. 4, 2021

Related U.S. Application Data

(63) Continuation-in-part of application No. 17/106,257, filed on Nov. 30, 2020, now abandoned.

(51) Int. Cl.
    *G06F 11/36* (2006.01)
    *G06N 5/04* (2006.01)
    *G06F 21/54* (2013.01)

(52) U.S. Cl.
    CPC ........ *G06F 11/3688* (2013.01); *G06F 11/368* (2013.01); *G06F 11/3692* (2013.01); *G06F 21/54* (2013.01); *G06N 5/048* (2013.01)

(58) Field of Classification Search
    None
    See application file for complete search history.

(56) References Cited

U.S. PATENT DOCUMENTS

| | | | | |
|---|---|---|---|---|
| 2018/0365139 | A1* | 12/2018 | Rajpal | G06N 5/003 |
| 2019/0384697 | A1* | 12/2019 | Phan | G06F 11/3676 |
| 2020/0341887 | A1* | 10/2020 | Landsborough | G06F 11/3692 |

OTHER PUBLICATIONS

Zhang, "AFL Extended with Test Case Prioritization Techniques", 2018, International Journal of Modeling and Optimization, vol. 8, No. 1, Feb. 2018 (Year: 2018).*

Bohme, "Coverage-based Greybox Fuzzing as Markov Chain", 2017, Transactions on Software Engineering, vol. XX, No. X, Dec. 2017 (Year: 2017).*

(Continued)

*Primary Examiner* — Hossain M Morshed
(74) *Attorney, Agent, or Firm* — Rimon PC; Marc Kaufman

(57) ABSTRACT

The disclosure is directed to a method, system and a computer readable medium of fuzzy testing a software system, using a grey-box fuzzy testing framework that optimizes the vulnerability exposure process while addressing security testing challenges. The grey-box fuzzy testing framework, unlike white-box testing, provides a focused and efficient assessment of a software system without analyzing each line of code. The disclosed embodiments provide a robust security mechanism that accumulates information about the system without increasing testing complexity, enabling fast and efficient security testing. The disclosed embodiments use security vulnerability metrics designed to identify vulnerable components in the software systems and ensures thorough testing of these components by assigning weights. A mutation engine may perform small data type mutations at the input's high-level design. The grey-box approach addresses three testing challenges: the system's complexity and size by avoiding intensive code analysis, outsourcing by limiting the knowledge about the system, and input and output fluctuation by creating a massive number of inputs.

23 Claims, 9 Drawing Sheets

(56) References Cited

OTHER PUBLICATIONS

S. Parkinson, et al., "Cyber threats facing autonomous and connected vehicles: Future challenges," IEEE transactions on intelligent transportation systems, vol. 18, No. 11, pp. 2898-2915, Jan. 1, 2017.
S. V. E. S. S. Committee et al., "Sae j3061-cybersecurity guidebook for cyber-physical automotive systems," SAE—Society of Automotive Engineers, Jan. 1, 2016.
L. J. Moukahal, et al., "Vehicle software engineering (vse): Research and practice," IEEE Internet of Things Journal, vol. 7, No. 10, pp. 10 137-10 149, Jan. 1, 2020.
B. Potter and G. McGraw, "Software security testing," IEEE Security & Privacy, vol. 2, No. 5, pp. 81-85, Jan. 1, 2004.
J. Drolia, et al., "Autoplug: An automotive test-bed for electronic controller unit testing and verification," in 2011 14th International IEEE Conference on Intelligent Transportation Systems (ITSC), Jan. 1, 2011, pp. 1187-1192.
S. Bayer, T. Enderle, D.-K. Oka, and M. Wolf, "Security crash test-practical security evaluations of automotive onboard it components," Automotive-Safety & Security, Jan. 1, 2015.
D. S. Fowler, J. Bryans, M. Cheah, P. Wooderson, and S. A. Shaikh, "A method for constructing automotive cybersecurity tests, a can fuzz testing example," in 2019 IEEE 19th International Conference on Software Quality, Reliability and Security Companion (QRS-C). IEEE, Jan. 1, 2019, pp. 1-8.
A. Pretschner, M. Broy, I. H. Kruger, and T. Stauner, "Software engineering for automotive systems: A roadmap," in Future of Software Engineering (FOSE'07). IEEE, Jan. 1, 2007, pp. 55-71.
M. Broy, I. H. Kruger, A. Pretschner, and C. Salzmann, "Engineering automotive software," Proceedings of the IEEE, vol. 95, No. 2, pp. 356-373, Jan. 1, 2007.
S. Moshtari, A. Sami, and M. Azimi, "Using complexity metrics to improve software security," Computer Fraud & Security, vol. 2013, No. 5, pp. 8-17, Jan. 1, 2013.
M. Broy, "Challenges in automotive software engineering," in Proceedings of the 28th International Conference on Software Engineering. ACM, Jan. 1, 2006, pp. 33-42.
S. A. Haider, G. Samdani, M. Ali, and M. Kamran, "A comparative analysis of in-house and outsourced development in software industry," International Journal of Computer Applications, vol. 141, No. 3, pp. 18-22, Jan. 1, 2016.
C. Hubmann, M. Becker, D. Althoff, D. Lenz, and C. Stiller, "Decision making for autonomous driving considering interaction and uncertain prediction of surrounding vehicles," in 2017 IEEE Intelligent Vehicles Symposium (IV). IEEE, Jan. 1, 2017, pp. 1671-1678.
P. Koopman and M. Wagner, "Challenges in autonomous vehicle testing and validation," SAE International Journal of Transportation Safety, vol. 4, No. 1, pp. 15-24, Jan. 1, 2016.
P. Koopman and M. Wagner, "Autonomous vehicle safety: An interdisciplinary challenge," IEEE Intelligent Transportation Systems Magazine, vol. 9, No. 1, pp. 90-96, Jan. 1, 2017.
J. De Winter, P. M. van Leeuwen, and R. Happee, "Advantages and disadvantages of driving simulators: A discussion," in Proceedings of measuring behavior, vol. 2012. Citeseer, Jan. 1, 2012, p. 8th.
C. Obermaier, R. Riebl, C. Facchi, A. Al-Bayatti, and S. Khan, "Limitations of hil test architectures for car2x communication devices and applications," in ACM Computer Science in Cars Symposium, Jan. 1, 2019, pp. 1-9.
I. Pekaric, C. Sauerwein, and M. Felderer, "Applying security testing techniques to automotive engineering," in Proceedings of the 14th International Conference on Availability, Reliability and Security, Jan. 1, 2019, pp. 1-10.
A. Imparato, R. R. Maietta, S. Scala, and V. Vacca, "A comparative study of static analysis tools for autosar automotive software components development," in 2017 IEEE International Symposium on Software Reliability Engineering Workshops (ISSREW). IEEE, Jan. 1, 2017, pp. 65-68.
S. Keul, "Tuning static data race analysis for automotive control software," in 2011 IEEE 11th International Working Conference on Source Code Analysis and Manipulation. IEEE, Jan. 1, 2011, pp. 45-54.
A. G. Bardas et al., "Static code analysis," Journal of Information Systems & Operations Management, vol. 4, No. 2, pp. 99-107, Jan. 1, 2010.
Z. B. Celik, E. Fernandes, E. Pauley, G. Tan, and P. McDaniel, "Program analysis of commodity iot applications for security and privacy: Challenges and opportunities," ACM Computing Surveys (CSUR), vol. 52, No. 4, pp. 1-30, Jan. 1, 2019.
K. A. Koscher, "Securing embedded systems: analyses of modern automotive systems and enabling near-real time dynamic analysis," Ph D. dissertation, Jan. 1, 2014.
G. Cabodi, D. F. S. Finocchiaro, and D. Montisci, "Security-oriented dynamic code analysis in automotive embedded systems." Jan. 1, 2017, Politecnico Di Torino, Master's Degree thesis in Ingegneria Informatica (Computer Engineering).
National Instruments Corp., "What is the iso 26262 functional safety standard?" Jan. 1, 2020. Available: https://www.ni.com/en-ca/innovations/white-papers/11/what-is-the-iso-26262-functional-safety-standard-html.
SAE International, "Society of automotive engineers—Overview," Jan. 1, 2020. Available at: https://www.sae.org/about.
InsectIndentification.org, "Bugfinder—insect search and identification tool." Jan. 1, 2017. Available: https://www.insectidentification.org/bugfinder-start.asp.
A. Zeller, R. Gopinath, M. Böhme, G. Fraser, and C. Holler, "The fuzzing book, Introduction to Software Testing" Jan. 1, 2019. Available: https://www.fuzzingbook.org/html/Intro_Testing.html.
Comma.ai., "FAQ/What is openpilot?" Jan. 1, 2020. Available: https://comma.ai/faq.
D. K. Oka, A. Yvard, S. Bayer, and T. Kreuzinger, "Enabling cyber security testing of automotive ecus by adding monitoring capabilities," in Embedded SECUrity in Cars Conference, 15th Escar Europe, Nov. 13, 2016.
M. Ring, J. Durrwang, F. Sommer, and R. Kriesten, "Survey on vehicular attacks-building a vulnerability database," in 2015 IEEE International Conference on Vehicular Electronics and Safety (ICVES). IEEE, Jan. 1, 2015, pp. 208-212.
F. Sommer, J. Dürrwang, and R. Kriesten, "Survey and classification of automotive security attacks," Information, vol. 10, No. 4, p. 148, Jan. 1, 2019.
K. Koscher, A. Czeskis, F. Roesner, S. Patel, T. Kohno, S. Checkoway, D. McCoy, B. Kantor, D. Anderson, H. Shacham et al., "Experimental security analysis of a modern automobile," in 2010 IEEE Symposium on Security and Privacy, Jan. 1, 2010, pp. 447-462.
M. Cheah, S. A. Shaikh, O. Haas, and A. Ruddle, "Towards a systematic security evaluation of the automotive bluetooth interface," Vehicular Communications, vol. 9, pp. 8-18, Jan. 1, 2017.
C. Corbett, T. Basic, T. Lukaseder, and F. Kargl, "A testing framework architecture for automotive intrusion detection systems," Automotive-Safety & Security 2017—Sicherheit und Zuverlässigkeit für automobile Informationstechnik, Jan. 1, 2017.
H. Liang, X. Pei, X. Jia, W. Shen, and J. Zhang, "Fuzzing: State of the art," IEEE Transactions on Reliability, vol. 67, No. 3, pp. 1199-1218, Jan. 1, 2018.
D. K. Oka, T. Fujikura, and R. Kurachi, "Shift left: Fuzzing earlier in the automotive software development lifecycle using hil systems," Jan. 1, 2018.
D. S. Fowler, J. Bryans, S. A. Shaikh, and P. Wooderson, "Fuzz testing for automotive cyber-security," in 2018 48th Annual IEEE/IFIP International Conference on Dependable Systems and Networks Workshops (DSN-W), Jan. 1, 2018, pp. 239-246.
P. Wang and X. Zhou, "Sok: The progress, challenges, and perspectives of directed greybox fuzzing," arXiv preprint arXiv:2005.11907, Jan. 1, 2020.
M. Zalewski, "American fuzzy lop.(2015)," URL http://lcamtuf.coredump.cx/afl, Jan. 1, 2015.
V.-T. Pham, M. Böhme, A. E. Santosa, A. R. Caciulescu, and A. Roy-choudhury, "Smart greybox fuzzing," IEEE Transactions on Software Engineering, Jan. 1, 2019.

(56) References Cited

OTHER PUBLICATIONS

C. Lemieux and K. Sen, "Fairfuzz: A targeted mutation strategy for increasing greybox fuzz testing coverage," in Proceedings of the 33rd ACM/IEEE International Conference on Automated Software Engineer¬ing, Jan. 1, 2018, pp. 175-485.
M. Böhme, V.-T. Pham, and A. Roychoudhury, "Coverage-based grey-box fuzzing as markov chain," IEEE Transactions on Software Engineering, vol. 45, No. 5, pp. 489-506, Jan. 1, 2017.
P. Chen and H. Chen, "Angora: Efficient fuzzing by principled search," in 2018 IEEE Symposium on Security and Privacy (SP). IEEE, Jan. 1, 2018, pp. 711-725.
V. Wüstholz and M. Christakis, "Learning inputs in greybox fuzzing," arXiv preprint arXiv:1807.07875, Jan. 1, 2018.
V. Jain, S. Rawat, C. Giuffrida, and H. Bos, "Tiff: using input type inference to improve fuzzing," in Proceedings of the 34th Annual Computer Security Applications Conference, Jan. 1, 2018, pp. 505-517.
S. Rawat and L. Mounier, "Offset-aware mutation based fuzzing for buffer overflow vulnerabilities: Few preliminary results," in 2011 IEEE Fourth International Conference on Software Testing, Verification and Validation Workshops. IEEE, Jan. 1, 2011, pp. 531-533.
R. C. Bhushan and D. D. Yadav, "No. of test cases required in achieving statement, branch and path coverage using 'gcov': An analysis," in 7th International Workshop on Computer Science and Engineering (WCSE 2017) Beijing, China, Jan. 1, 2017, pp. 176-180.
Wikipedia, "Fuzzing," Oct. 24, 2020. Available: https://en.wikipedia.org/w/index.php?title=Fuzzing&oldid=985264480.
Team Upstream, "Q1 2019 sees a rapid growth of automotive cyber incidents." Jun. 1, 2019. Available: https://www.upstream.auto/blog/q1-2019-sees-a-rapid-growth-of-automotive-cyber-incidents/.
National Instruments Corp, "What is the iso 26262 functional safety standard?" Available: https://www.ni.com/en-ca/innovations/white-papers/11/what-is-the-iso-26262-functional-safety-standard-.html. Wait On This One.
International Organization for Standardization, "Iso/iec 27005". Jan. 1, 2018. Available: https://www.iso.org/standard/43464.html.
Sae Mobilus, "Road vehicles—cybersecurity engineering iso/sae dis 21434". Feb. 12, 2020, SAE International, Vehicle Cybersecurity Systems Engineering Committee. Available: https://www.sae.org/standards/content/iso/sae21434.d1/.
D. Oka, Ponemon Institute, "Securing the modern vehicle: A study of automotive industry cybersecurity practices," An independent study commissioned by SAE International and Synopsys, Dec. 1, 2018.
Etas, "Successful security tests using fuzzing and hil test systems.," Translated article "Effektive Security—Tests am HiL-System," Hanser Automotive Nov. 1, 2016. Available: https://www.etas.com/download-center-files/products LABCAR Software Products/Hanser-automotive Successful-security-tests-hil-system en.pdf.
John Mcshane, Escrypt, "The fuzz on automotive cybersecurity testing." Escrypt North America blog, Oct. 5, 2020. Available at: https://securitybyescrypt.com/fuzztesting/.
Synopsys, "Defensics fuzz testing." Jan. 1, 2019. Available: https://www.synopsys.com/software-integrity/security-testing/fuzz-testing.html.
Pearl-Doughty White, et al., Informationisbeautiful.net. "Million Lines of Code—Information is Beautiful", Sep. 24, 2015. Available: https://www.informationisbeautiful.net/visualizations/million-lines-of-code/.
Vector Informatik GmbH, "Testing ecus and networks with CANoel." Jan. 1, 2017. Available: https://www.vector.com/int/en/products/products-a-z/software/canoe/.
Opal-rt., "Opal-rt testing platform for automotive simulation." Mar. 1, 2019. Available: https://www.opal-rt.com/automotive-overview/.
Simulationx, "Design and Analyze Your Multi-Physics System with Simulation Software." Feb. 1, 2019. Available: https://www.simulationx.com/industries/simulation-automotive.html.
Mathworks, "Polyspace code prover." Jan. 1, 2017. Available: https://www.mathworks.com/products/polyspace-code-prover.html.
MISRA, "What is MISRA?", Jan. 1, 2017. Available: https://www.misra.org.uk/MISRAHome/WhatisMISRA/tabid/66/Default.aspx.
G. Zhang and X. Zhou, "afl extended with test case prioritization techniques," Int. J. Model. Optim, vol. 8, No. 1, pp. 41-45, Feb. 1, 2018.
Omnet++, "Simulation Model and Tools," Jan. 1, 2017, Available at: https://omnetpp.org/download/models-and-tools.
Qa Systems, "Integrated Static Analysis;" Jan. 1, 2018, Available at: https://www.qa-systems.com/tools/integrated-static-analysis/.
Auto-Isac, "Automotive information sharing and analysis center," Membership and Best Practices, Jan. 1, 2017, Available at https://automotiveisac.com/.
Openpilot, "What is Openpilot?", Jun. 11, 2018, Available at: https://github.com/commaai/openpilot#what-is-openpilot.
Openpilot, "Process Replay," Jan. 1, 2018. Available at: https://github.com/commaai/openpilot/tree/master/selfdrive/test/process_replay.
Brennich, T., Moser, M. Putting Automotive Security to the Test. ATZ Electron Worldw 15, 46-51 (Jan. 1, 2020). https://doi.org/10.1007/s38314-019-0155-9.
D. S. Fowler, J. Bryans, S. A. Shaikh, and P. Wooderson, "Fuzz testing for automotive cyber-security," in 2018 48th Annual IEEE/IFIP International Conference on Dependable Systems and Networks Workshops (DSN-W). IEEE, Jan. 1, 2018, pp. 239-246.
D. Durisic, M. Nilsson, M. Staron, and J. Hansson, "Measuring the impact of changes to the complexity and coupling properties of automotive software systems," Journal of Systems and Software, vol. 86, No. 5, pp. 1275-1293, Dec. 20, 2012.
Y. Shin and L. Williams, "Can traditional fault prediction models be used for vulnerability prediction?" Empirical Software Engineering, vol. 18, No. 1, pp. 25-59, Dec. 9, 2011.
Chowdhury and M. Zulkernine, "Using complexity, coupling, and cohesion metrics as early indicators of vulnerabilities," Journal of Systems Architecture, vol. 57, No. 3, pp. 294-313, Jun. 19, 2010.
A. Taylor, S. Leblanc, and N. Japkowicz, "Probing the limits of anomaly detectors for automobiles with a cyberattack framework," IEEE Intelligent Systems, vol. 33, No. 2, pp. 54-62, Mar. 1, 2018.
T. Huang, J. Zhou, and A. Bytes, "Atg: An attack traffic generation tool for security testing of in-vehicle CAN bus," in Proceedings of the 13th International Conference on Availability, Reliability and Security, Aug. 27, 2018, pp. 1-6.
L. Moukahal and M. Zulkernine, "Security vulnerability metrics for connected vehicles," in 2019 IEEE 19th International Conference on Software Quality, Reliability and Security Companion (QRS-C). IEEE, Jan. 1, 2019, pp. 17-23.
Autosar, "Autosar—enabling continuous innovations—About—Organization," Jan. 1, 2020, Available at https://www.autosar.org/about/organization/.
EP21209587.1 Extended European Search Report dated Feb. 5, 2022.
Pengfei, W., et al., "SoK: The Progress, Challenges, and Perspectives of Directed Greybox Fuzzing." ARXIV.ORG, Cornell University Library; Ithaca, NY 14853; Jun. 4, 2020; 16 pages.
Liang, H., et al., "Sequence Directed Hybrid Fuzzing" 2020 IEEE 27th International Conference on Software Analysis, Evolution and Reengineering (SANER), IEEE; Feb. 18, 2020; pp. 127-137.
Moukahal, L., et al., "Vulnerability-Oriented Fuzz Testing for Connected Autonomous Vehicle Systems." IEEE Transactions on Reliability, IEEE Service Center, Piscataway, NJ, US; Oct. 4, 2021; pp. 1422-1437; vol. 7, No. 4.

\* cited by examiner

| Input Format | Voltage | Ignition Line | Controls Allowed | CAN Send Error | CAN Forward Error |
|---|---|---|---|---|---|
| Initial Seed  s | 0 | FALSE | FALSE | 0 | 0 |
| Framework  $s_1$ | 0 | TRUE | FALSE | 0 | 0 |
| Framework  $s_2$ | 2 | FALSE | FALSE | 0 | 0 |
| AFL  $s_3$ | 0 | F@LSE | FALSE | 0 | 0 |
| AFL  $s_4$ | p | FALSE | FALSE | 0 | 0 |

FIGURE 4

FUZZY TESTING A SOFTWARE SYSTEM

RELATED APPLICATION DATA

This application is a Continuation-in-Part (CIP) of application Ser. No. 17/106,257, filed on Nov. 30, 2020, the disclosure of which is incorporated herein.

FIELD OF THE INVENTION

The present invention relates to methods of fuzzy testing a software system, and systems and computer programs for carrying out such methods.

BACKGROUND OF THE INVENTION

Testing of software systems is an important part of software development and deployment. The sheer volume of code/instructions that make up a software system means that "faults" (e.g. bugs, errors, security weaknesses or other problematic issues) are likely to be introduced (usually accidentally) when writing the code for a software system. If testing of the software system is not carried out, such faults will be retained in the software system after deployment and may subsequently cause problems during execution of the software system. Such problems may be relatively harmless or inconvenient; other problems may provide unexpected/unintentional behaviour from the software system, including crashes of the software system; other problems may be more catastrophic, even potentially leading to loss of life (e.g. if the software system is controlling a physical system involving, or interacting with, people/animals). Some faults may provide an attack vector by which an attacker may perform one or more attacks, which can then lead to problems such as loss of functionality, provision of unauthorized access to functionality/data to the attacker, etc., all of which have consequential costs and implications.

Herein, a "software system" may be considered to be an entire/complete system of software (code/instructions); however, the "software system" may be a sub-system or component of a larger system of software. In general, a software system comprises a plurality of "callable units" and is arranged to receive input for the software system to process. Each "callable unit" may be, for example, a respective one of: a routine; a subroutine; a function; a procedure; a process; a class method; an interface; a component; or a subsystem of a larger system; etc. References herein to specific types of callable unit (e.g. references to a "function" or a "component") should be taken to include references to other types of callable unit.

The following discussion shall focus on the "software system" being a software system for controlling (at least in part) operation of a vehicle, such as a software system controlling driving for an autonomous vehicle. However, it will be appreciated that the techniques and issues discussed herein are applicable more broadly to other types of software system, and that the description herein should not be considered limited to just software system for controlling (at least in part) operation of a vehicle.

The vehicle industry is confronting numerous safety challenges. Protecting drivers is no longer limited to equipping vehicles with seatbelts and airbags, but it expands to implementing proper security and safety measures that defend vehicles from malicious cyberattacks. Rapid progression in technology and network connectivity have changed the shape of vehicles. Modern automobiles are not just mechanical devices controlled and driven solely by humans solely. They are Connected Autonomous Vehicles (CAVs) that combine infrastructure and computer processing with advanced wireless communication to make decisions and provide drivers and passengers with a safer and more entertaining experience.

While the race between Original Equipment Manufacturers (OEMs) towards autonomous driving and driver assistance continues, attackers' chances in controlling vehicles increase [1]. Software integration and connectivity enable vehicles to be intelligent devices. However, this opens the window for software defects and vulnerabilities that attract malicious behaviour. In fact, vehicles with both human drivers and autonomous driving or driver assistance features pose the greatest risk due to the maximized attack surface compared to fully manual, disconnected vehicles or fully autonomous vehicles. Internet exposure introduces a plethora of vulnerabilities and facilitates attackers' jobs. Hackers' threats in the vehicle's domain are not limited to a breach that only exploits personal data; they can amplify the risk by altering the vehicle software system. There are currently many recorded vehicle attacks initiated against different vehicle manufacturers [2]. Accordingly, OEMs are striving to enhance their security measures to increase the vehicles' resilience to cyberattacks.

Since modern vehicle development depends on software, securing the development life cycle is a vital task to provide consumers with better experiences. Different standards like AUTomotive Open System ARchitecture (AUTOSAR) [3], J3061 [4], and ISO 26262 [5] highlight the importance of deploying security measures during all the phases of vehicle software engineering (VSE) [6]. As the need for developing secure vehicle software systems is higher than ever, the International Organization of Standardization (ISO) [7] is collaborating with the Society of Automotive Engineer (SAE) [8] to design a standard, ISO/SAE 21434 [9], that specifically targets secure development. The standard aims to aid OEMs in addressing cybersecurity issues during the entire vehicle engineering life cycle.

Before a vehicle release, security engineers need to verify the system's security to avoid catastrophic incidents. The lack of quality assurance and testing procedures in the vehicle industry is one of the primary factors contributing to the existence of vulnerabilities [10]. Clearly, security testing is a crucial phase in VSE to identify vulnerabilities and system weaknesses. Different security assurance methods are utilized in the vehicle industry, including static code analysis, dynamic code analysis, and vulnerability scanning, penetration testing and fuzzy testing [11]. These security testing techniques can diminish the vulnerabilities in a system [12].

Regardless, security testing for vehicle software systems is a complex task that leaves OEMs with multiple challenges [6]. The vehicle software system is a complex system with around a hundred million lines of code residing and running on dozens of Electronic Control Units (ECUs) [13]. These ECUs may operate based on inputs from radars, lidars, cameras, ultrasonic sensors, temperature sensors, tyre pressure sensors, and many other sensors. As vehicles operate in a continuously evolving environment, inputs of ECUs can vary drastically. Hence, it is difficult or impossible to predict all possible input combinations of ECUs.

Some researchers [10], [14]-[17] consider fuzzy testing one of the most suitable tools for discovering vulnerabilities in the vehicle software systems. However, only a few works introduce fuzzy testing tools explicitly designed for the vehicle industry [10], [15], [16], [18]. Research efforts in this area are limited to evaluating and studying the applicability of black-box fuzzy testing for CAVs [19], [20]. Nevertheless, adopting such a testing methodology for a safety-critical system is not a reliable solution. Black-box random fuzzing cannot provide a complete picture of which components are tested. For this reason, the vehicle industry needs a software security testing solution that can facilitate the testing process, simulate the environment of vehicles, and target vulnerabilities.

Security testing is a powerful mechanism to detect and identify the system's vulnerabilities. In a critical system like a vehicle software system, software testing can prevent life-threatening incidents. Nevertheless, many challenges make security testing a complex task in the vehicle industry. Some of these challenges are set out below.

System Complexity and Size

Vehicle software systems comprise heterogeneous functionalities like safety-related functionalities, infrastructure software, and multimedia systems [6], [21]. The vast number of operations a CAV has to perform increases the Source Line of Code (SLOC) and the hardware devices needed. Vehicle software systems are considered one of the largest existing systems [22], [23]. Security engineers need to ensure stable system operation, yet as the system's size is relatively large, this job becomes a time-consuming one. What makes the job of security engineers even more challenging is the complexity of the system. The heterogeneous functions of vehicle software systems adopt various advancements and technologies like sensors, ECUs, network connectivity, artificial intelligence, data analysis, and many other things. All these components make the system a complex one and are expected to function seamlessly and correctly. It is well studied that complex code is challenging to design and develop, leaving a high margin for vulnerabilities and security issues [24]-[27]. Security engineers have to manage the code complexity and size to validate the security and ensure that the system will not reach a state of hazard during its entire operational lifetime.

Outsourcing

The development of heterogeneous functionalities embedded within vehicle software systems requires diverse expertise and skills. Hence, OEMs tend to outsource a substantial number of vehicular functionalities [28]. Though this may improve product quality, outsourcing makes security engineers' jobs more complicated. Software developed by a third party can introduce new threats and vulnerabilities to the system [29]. This is made even harder due to a hierarchical and sometimes complex supply chain. Security engineers must deal with applications and certify their security and reliability without knowing their underlying development details or full provenance. Moreover, security testing and system failure rates should be applied to the whole system. As many functionalities in the vehicle software system depend on each other, this process might be delayed until all the components are fully integrated, significantly reducing available testing and analysis time.

Input and Output Fluctuation

CAVs make reasonable decisions based on the surrounding environment to drive passengers safely to a specific destination. They may utilize devices such as one or more of sensors, radars, lidars, and cameras to gather the needed information to understand road conditions, weather conditions, and surrounding traffic [30]. Assessing the set of all possible external environmental data is an intractable problem. Hence, testing and validating vehicle software systems' behaviour is a challenging task. Besides external data, ECUs exchange internal data to trigger specific events. For example, the Powertrain Control Module (PCM) controls the fuel consumption needed to propel the vehicle. The PCM relies on different inputs to determine the correct mixture ratio, including engine temperature, air temperature, and throttle position. In modern vehicles, the PCM also receives internal information from the Adaptive Cruise Control (ACC) ECU to control the speed. Security engineers have to validate that the system's catastrophic failure rate falls within an acceptable range, requiring hours of intensive testing that should cover a large number of possibilities [31].

Test-Bed Complexity

Testing conditions considerably affect the accuracy of the results. Security assurance and validation of the system should be conducted with the same conditions as a real world scenario. Considering the structure and intricate architecture of a vehicle software system, simulating a real environment becomes an expensive and time-consuming job [30]. Vehicles operate in a wide range of different scenarios, including diverse roads, speeds, visibilities, densities, communication patterns, and drivers. Mimicking one scenario might not be enough to ensure a safe and secure system. Many industrial solutions provide OEMs Software in the Loop (SiL) and Hardware in the Loop (HIL) testing simulators that mimic a real environment to evaluate a vehicle software system [33]-[36]. Nevertheless, some limitations hinder simulators from becoming a complete solution capable of replacing real-world testing for autonomous vehicles. Simulators are error-prone and may fail to simulate real-world scenarios comprehensively [37], [38].

It will be appreciated that the above-mentioned challenges, and possibly other challenges too, apply equally, or analogously, to software systems with other uses (i.e. not just to software systems for vehicles).

Safety and security are strongly related disciplines in the vehicle industry. Any security loophole within vehicle software systems may have a drastic effect on the vehicle's safety, making cybersecurity assurance an indispensable job within VSE. During the security verification and validation phase, security engineers must guarantee that the vehicle system is developed and designed following cybersecurity requirements of vehicle standards like AUTOSAR, ISO 26262, and the coming ISO/SAE 21434 standard. This includes planning, reporting, and, most importantly, a series of security testing to validate the vehicle software system's protection mechanisms. As the vehicle system incorporates various advancements, including different communication means and hardware devices, ensuring the system's security throughout its entire lifespan requires adopting several security testing techniques. Some of the testing techniques are automatically incorporated into the development process to identify promptly potential weaknesses, while other techniques require human intervention and run after the development phase [11]. Some of the most common security assurance methods utilized in the vehicle industry are: fuzzy testing, penetration testing, static code analysis, and vulnerability scanning. These are discussed in more detail below:

Static Code Analysis

Recommended by ISO 26262 [5], among many others, static code analysis is a white-box testing method that dynamically and automatically analyzes the vehicle system's source code to identify programming errors that leave the system vulnerable [39]. Imparato et al. [40] examine the potential of existing static analysis tools in identifying loopholes in automotive software components. Their study shows that Bug Finder [41] and Polyspace Code Prover [42] identify only a few code portions that do not comply with safety and security standards even though these tools are highly performant in other systems. The Quality Accelerated (QA) [43] tool performs better in recognizing software defects that do not comply with the MISRA coding standard developed by the Motor Industry Software Reliability Association [44]. Keul [45] highlights the importance of identifying race conditions in multi-threading components of automotive software components—the author proposes a static race condition code analyzer and shows its potential in detecting severe defects that lead the safety-critical system to states of hazard.

Static code analysis tools can quickly run during the development phase to identify a wide range of code defects that weaken the system. They are generally considered worthwhile, especially in MISRA compliance.

Nevertheless, the capabilities of these scanners are limited. They have a high false-positive warning that can waste security testers' time [46]. Static code analyzers cannot discover vulnerabilities whose cause is not well understood and modelled in source code (e.g. unchecked inputs and bounds), and thus additional tools are required.

Dynamic Program Analysis

Dynamic program analysis examines and monitors a program execution to discover the program reaction and determine incorrect behaviours. It covers all typical software testing forms, including unit, component, integration, and system testing. From a security point of view, it is utilized to look for dangerous conditions such as memory errors, concurrency errors, and crashes. Celik et al. [47] motivate program analysis techniques to identify security and privacy issues in the Internet of Things (IoT) systems like automotive systems. In their study, the researchers show the power of dynamic program analysis in discovering vulnerabilities that cannot be identified with other techniques like static code analysis. Koscher [48] highlight the severity of residing vulnerabilities in automotive systems and stress the applicability of dynamic program analysis in identifying automotive vulnerabilities quickly and easily. The researcher presents a dynamic analysis tool that simulates inputs and outputs of embedded ECUs in near-real-time. Cabodi et al. [49] propose a dynamic program analysis tool for automotive systems security testing that monitors and analyzes CAN message routing and filtering to identify erratic behaviours. Their case study on a gateway ECU shows the tool's effectiveness in minimizing workload and identifying unusual reactions.

Though dynamic program analysis can expose vulnerabilities that cannot be triggered by static code analysis, it can only cover known software issues.

Dynamic program analysis runs against predefined scenarios. Hence, limiting the scope of testing. Moreover, such a security testing assurance method might fail to execute all the system components, bounding the vulnerability validation process to only some code areas.

Vulnerability Scanning

Vulnerability scanning validates the resilience of the vehicle software system against known vulnerabilities and security gaps. In other words, such a security assurance method can detect development errors that are not fully traceable but with related attacks. Such a testing technique requires previous knowledge about attacks and security issues in the vehicle industry. In 2015, leading pioneers within the industry cooperated and formed Automotive Information Sharing and Analysis Center (AUTO-ISAC) [50] to globally collect and analyze emerging cybersecurity risks in the vehicle industry. AUTO-ISAC supplies OEMs with information about identified vulnerabilities by more than 30 automakers, enabling faster vulnerability detection and shared responsibility. Besides industrial forces to improve vulnerability scanning, researchers contribute to this process by consolidating existing attacks. Ring et al. [51] built a database of discovered vulnerabilities to facilitate access during the security validation and verification phase. Similarly, Sommer et al. [52] examine and classify automotive security attacks to enrich the security testing phase of VSE. Undoubtedly, vulnerability scanning is crucial to avoid recurring attacks, including attacks discovered during penetration testing, and can also be applied quite early in the development cycle. However, such a security testing tool does not comprehensively evaluate the system. Systems developed by various parties have different weaknesses that vulnerability scanning fails to recognize. Thus, scanning must continually be tailored for each specific system, and additional testing tools are required.

Penetration Testing

To validate the resilience of vehicle software systems against malicious behaviour, penetration testing may be performed. Penetration testing is the most researched testing technique in the vehicle industry [39]. Koscher et al. [53] experiment vehicles' security by conducting several kinds of physical and remote attacks. By simulating replay attacks, the researcher could bypass fundamental network security protections within the vehicle. Cheah et al. [54] employ penetration testing to evaluate the security of vehicles' Bluetooth interfaces. Other researchers utilize penetration testing to evaluate in-vehicle communication security. Corbett et al. [55] introduce a testing framework that attempts to bypass the in-vehicle Network Intrusion Detection System (NIDS). Taylor et al. [56] design an anomaly detection framework suited for the CAN bus. The researchers study previous successful attacks to identify common characteristics and simulate a range of new attacks. Huang et al. [57] validate the CAN defence mechanism by proposing a tool that automatically injects attack packets into the CAN bus.

Though researchers identified several security loopholes within the vehicle system by conducting penetration testing, such a testing method is most potent to validate vehicular network security. Done well, penetration testing generates the most significant and meaningful results but is the most time consuming, the least complete, and requires tremendous and rare expertise. Automation of known attacks is always a vital aspect of a functional penetration testing strategy in VSE. With all these techniques stacked up, good coverage of well-known issues and attacks, as well as the most likely and significant attacks, can be reasonably well covered. Nevertheless, it is not enough to conduct penetration testing to ensure the resilience of vehicle software systems Fuzzy Testing Fuzzy testing is a robust testing technique that validates the system behaviour against arbitrary inputs to identify unexpected behaviours that attackers can use to initiate attacks [58]. See also https://en.wikipedia.org/wifi/Fuzzing (the entire disclosure of which is incorporated herein by reference in its entirety). Three different testing methodologies can be employed: white-box, black-box, and grey-box fuzzy testing.

Researchers in the vehicle industry focus on black-box fuzzy testing and avoid adopting white-box fuzzy testing. Though white-box testing can comprehensively evaluate the system, considering the system's complexity and size, deploying such a mechanism in the vehicle industry is a time-consuming job that requires significant effort. Moreover, as many components of the vehicle software system are out-sourced, applying white-box testing on all the components is impractical.

Oka et al. [19] consider black-box fuzzy testing as one of the powerful tools to discover vulnerabilities within vehicle software systems. They prove its efficiency by performing fuzzy testing on an Engine ECU and Gateway ECU. The researchers successfully identify corrupted Pulse-width Modulation (PWM) frequencies by monitoring engine ECU response to fuzzy and random messages.

In another research work, Oka et al. [59] highlight the challenges of validating and testing a complicated and broad system like the vehicle software system. Initiating the testing after the completion of the system can cause delays in vehicle production. Oka et al. find that fuzzing allows the testing to start at an earlier stage in the development process. Random inputs can replace the required inputs needed to verify the developed functionalities.

Similarly, Fowler et al. [20], [60] use arbitrary Controller Area Network (CAN) fuzzer to identify security issues in ECUs. They perform black-box fuzzing on a lab vehicle's display ECU and show the benefit of fuzzing automotive inputs to identify bugs and weaknesses in the vehicle software system.

Despite black-box fuzzy testing's ability to manage the system's complexity, outsourcing, and input and output fluctuation challenges, conducting blind testing for a safety-critical system is risky. Black-box cannot guarantee good coverage and a thorough evaluation of the system. In addition, arbitrary test cases may not pass initial input validation requirements prohibiting the testing from expanding to the system's core. Adopting such a testing methodology in the vehicle industry cannot ensure a risk-free lifespan.

Other Grey-Box Fuzzy Testing Techniques

Recently, grey-box fuzzing has become a popular security testing tool [61]. The most notable grey-box fuzzy testing technique is the American Fuzzy Lop (AFL) [62]. AFL collects coverage information to identify valuable test cases that expand code coverage. Various strategies are introduced to enhance the coverage and performance of AFL [63]-[65].

Existing grey-box fuzzy techniques are particularly unsuited to systems such as CAVs and their associated challenges of system complexity and size. They spend hours of testing, focusing entirely on expanding code coverage. Zhang et al. [66] attempt to rank the seeds generated by AFL, but their test case prioritization does not guide the testing in a specific direction. Bohme et al. [65] introduce Directed Greybox Fuzzing (DGF) that focuses on testing targets specified by the user. This goal is addressed by eliminating the test cases that are far from the targets. They calculate the minimum distance between the system nodes to identify close seeds. Minimum distance forms a significant limitation as it eliminates crucial paths in the system that can hold bugs. DGF depends on the prior knowledge of vulnerable areas, which can be guided by threat and risk assessment but cannot be complete. Moreover, when testing a newly developed system, it is essential to examine the whole system rather than just specific functions.

SUMMARY OF THE INVENTION

Embodiments of the invention aim to address the above-mentioned deficiencies in software testing and security assurance. This objective is achieved by a grey-box fuzzy testing framework that optimizes the vulnerability exposure process while addressing security testing challenges, such as those faced by the vehicle industry. Grey-box fuzzy testing is a robust security mechanism that accumulates information about the system without increasing testing complexity, enabling fast and efficient security testing. Embodiments of the invention provide a vulnerability-oriented fuzzy testing framework that may systematically prioritize the testing toward weak components of the software systems (such as vehicle software systems). The framework utilizes security vulnerability metrics designed to identify vulnerable components in the software systems and ensure thorough testing of these components by assigning weights. Moreover, in some embodiments, to bypass the input validation of some systems, the mutation engine of some embodiments of the invention may perform small data type mutations at the inputs' high-level design. Embodiments of the invention may knowledgeably validate the system's components without increasing testing complexity, offering a security testing tool that manages the various testing challenges efficiently and reliably. Hence, it expands vulnerability identification during the development phase which can strengthen the resilience of software systems against unprecedented cyber-attacks.

Grey-box fuzzy testing provides a focused and efficient assessment of a software system without analyzing each line of code. Unlike white-box testing, which applies intensive code analysis and constraint solving, grey-box testing does not cause high overheads. Simultaneously, grey-box fuzzing overcomes black-box fuzzing randomness while generating a large number of test cases quickly. Hence, the grey-box approach addresses three testing challenges: the system's complexity and size by avoiding intensive code analysis, outsourcing by limiting the knowledge about the system, and input and output fluctuation by creating a massive number of inputs.

According to a first aspect of the invention, there is provided a method of fuzzy testing a software system, wherein the software system comprises a plurality of callable units and is arranged to receive input for the software system to process, the method comprising: determining, for each callable unit of the plurality of callable units, based on one or more security vulnerability metrics, a target number of times that callable unit is to be tested; initializing a ranked plurality of queues, each queue for storing one or more seeds, said initializing comprising storing one or more initial seeds in a corresponding queue of the ranked plurality of queues; performing a sequence of tests, wherein performing each test comprises: obtaining a seed from the highest ranked non-empty queue; performing a mutation process on the obtained seed to generate a test seed; providing the test seed as input to the software system for the software system to process; and evaluating the processing of the test seed by the software system to generate a result for the test; wherein each queue in the ranked plurality of queues has an associated seed addition criterion and wherein performing each test comprises either (a) adding the test seed to the highest ranked queue in the ranked plurality of queues for which the test seed meets the seed addition criterion associated with that queue; or (b) discarding the test seed if the test seed does not meet the seed addition criterion associated with any of the queues in the ranked plurality of queues; wherein the seed addition criteria are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added, wherein a callable unit is a callable unit of interest if the current number of tests that have resulted in execution of that callable unit is less than the target number of times that callable unit is to be tested.

In some embodiments of the first aspect, the seed addition criteria are configured so that, if processing of a first test seed by the software system involves an execution path approaching a callable unit of interest but does not involve execution of a callable unit of interest and if processing of a second test seed by the software system involves execution of a callable unit of interest, then the queue to which the first test seed is added is of higher rank than the queue to which the second test seed is added. Alternatively, in some embodiments of the first aspect, the seed addition criteria are configured so that, if processing of a first test seed by the software system involves an execution path approaching a callable unit of interest but does not involve execution of a callable unit of interest and if processing of a second test seed by the software system involves execution of a callable unit of interest, then the queue to which the first test seed is added is of lower rank than the queue to which the second test seed is added.

In some embodiments of the first aspect, the seed addition criteria are configured so that, if processing of a first test seed by the software system involves execution of, or an execution path approaching, one or more first callable units of interest and if processing of a second test seed by the software system involves execution of, or an execution path approaching, one or more second callable units of interest, then the queue to which the first test seed is added is of higher rank than the queue to which the second test seed is added if: (a) at least one of the one or more first callable units of interest has a remaining number of times to be tested greater than a remaining number of times each of the one or more second callable units of interest are to be tested; or (b) a sum of a remaining number of times each of the one or more first callable units of interest are to be tested is greater than a sum of a remaining number of times each of the one or more second callable units of interest are to be tested.

In some embodiments of the first aspect, the seed addition criterion for a first queue is that processing of the test seed by the software system involves execution of, or an execution path approaching, a callable unit of interest. Additionally or alternatively, in some embodiments of the first aspect, the seed addition criterion for a second queue is that processing of the test seed by the software system reaches a branch point in the software system that has not been reached when performing a previous test. The first queue may have a higher rank than the second queue. The ranked plurality of queues may be the set containing the first queue and the second queue.

In some embodiments of the first aspect, obtaining a seed from the highest ranked non-empty queue comprises removing the seed from the highest ranked non-empty queue.

In some embodiments of the first aspect, the method comprises determining, for the test seed, a corresponding reuse amount indicative of a number of future tests for which that seed may be used as an obtained seed. Determining, for the test seed, a corresponding reuse amount may comprise: setting the reuse amount to be a first predetermined value if processing of the test seed by the software system involves execution of a callable unit of interest; setting the reuse amount to be a second predetermined value if processing of the test seed by the software system does not involve execution of a callable unit of interest but does involve an execution path approaching a callable unit of interest; setting the reuse amount to be a third predetermined value if processing of the test seed by the software system does not involve execution of, or an execution path approaching, a callable unit of interest but does reach a branch point in the software system that has not been reached when performing a previous test. In some such embodiments, either: (a) the first predetermined value is greater than the second predetermined value, and the second predetermined value is greater than the third predetermined value; or (b) the second predetermined value is greater than the first predetermined value, and the first predetermined value is greater than the third predetermined value. Additionally or alternatively, the method may comprise, for each stored seed, storing the corresponding reuse amount, wherein obtaining a seed from the highest ranked non-empty queue comprises decrementing the reuse amount corresponding to the seed and either (a) retaining the seed in the highest ranked non-empty queue and if the reuse amount corresponding to the seed is non-zero and (b) removing the seed from the highest ranked non-empty queue if the reuse amount corresponding to the seed is zero. Additionally or alternatively, adding the test seed to the highest ranked queue in the ranked plurality of queues for which the test seed meets the seed addition criterion associated with that queue may comprise adding the test seed to the highest ranked queue in the ranked plurality of queues for which the test seed meets the seed addition criterion associated with that queue a number of times equal to the reuse amount, wherein obtaining a seed from the highest ranked non-empty queue may then comprise removing the seed from the highest ranked non-empty queue.

In some embodiments of the first aspect, performing a mutation process on the obtained seed to generate a test seed comprises mutating the obtained seed to form the test seed.

In some embodiments of the first aspect, performing a mutation process on the obtained seed to generate a test seed comprises: (a) setting the test seed to be the obtained seed if the obtained seed is an initial seed; and (b) mutating the obtained seed to form the test seed otherwise.

In some embodiments of the first aspect, for each callable unit of the plurality of callable units, determining the target number of times that callable unit is to be tested may generate a higher target number when the one or more security vulnerability metrics indicate a higher level of security vulnerability for the callable unit.

In some embodiments of the first aspect, initializing the ranked plurality of queues comprising storing each of the one or more initial seeds in the highest ranked queue.

In some embodiments of the first aspect, the sequence of tests is performed until a termination condition is met, wherein the termination condition comprises one or more of: (a) each of queue in the ranked plurality of queues is empty; (b) a threshold number of tests have been performed; and (c) a threshold amount of time has been spent in performing the sequence of tests.

In some embodiments of the first aspect, processing of a test seed by the software system is considered to involve an execution path approaching a first callable unit if the first callable unit is reachable in a call graph for the software system from a furthest callable unit, wherein the furthest callable unit is a callable unit of the execution path for which there is no other callable unit of the execution path that is further in the call graph from a root node in the call graph and: (a) a number of callable units in the call graph between the furthest callable unit and the first callable unit is at most a predetermined threshold; or (b) a number of callable units in the call graph between the furthest callable unit and the root node is at least a predetermined threshold; or (c) an amount of code in the call graph above the furthest callable unit is at least a predetermined threshold; or (d) an amount of code in the call graph below the furthest callable unit is at most a predetermined threshold; or (e) an amount of code in the call graph between the furthest callable unit and the first callable unit is at most a predetermined threshold.

In some embodiments of the first aspect, the method comprises providing an output for the fuzzy testing based on the results generated from the performed tests.

In some embodiments of the first aspect, the software system is a software system of vehicle.

In some embodiments of the first aspect, each callable unit is a respective one of: a routine; a subroutine; a function; a procedure; a process; a class method; an interface; a component; or a subsystem of a larger system.

In some embodiments of the first aspect, the one or more security vulnerability metrics comprise one or more of: (a) a metric representing a degree of security vulnerability and/or security criticality of a callable unit; (b) a metric representing a risk that a malicious message may be passed from one callable unit to another callable unit; (c) a metric based on a number of and/or types of communication techniques used by a callable unit; (d) a metric based on a level of complexity of code of a callable unit; (e) a metric based on a number of input and output parameters of a callable function which have varying values and/or a degree to which input and output parameters of a callable function can have varying values; and (f) a metric based on historical vulnerability data relating to a callable unit.

According to a second aspect of the invention, there is provided a testing system for fuzzy testing a software system, wherein the software system comprises a plurality of callable units and is arranged to receive input for the software system to process, the testing system comprising one or more processors arranged to: determine, for each callable unit of the plurality of callable units, based on one or more security vulnerability metrics, a target number of times that callable unit is to be tested; initialize a ranked plurality of queues, each queue for storing one or more seeds, said initializing comprising storing one or more initial seeds in a corresponding queue of the ranked plurality of queues; perform a sequence of tests, wherein performing each test comprises: obtaining a seed from the highest ranked non-empty queue; performing a mutation process on the obtained seed to generate a test seed; providing the test seed as input to the software system for the software system to process; and evaluating the processing of the test seed by the software system to generate a result for the test; wherein each queue in the ranked plurality of queues has an associated seed addition criterion and wherein performing each test comprises either (a) adding the test seed to the highest ranked queue in the ranked plurality of queues for which the test seed meets the seed addition criterion associated with that queue; or (b) discarding the test seed if the test seed does not meet the seed addition criterion associated with any of the queues in the ranked plurality of queues; wherein the seed addition criteria are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added, wherein a callable unit is a callable unit of interest if the current number of tests that have resulted in execution of that callable unit is less than the target number of times that callable unit is to be tested.

In some embodiments of the second aspect, the seed addition criteria are configured so that, if processing of a first test seed by the software system involves an execution path approaching a callable unit of interest but does not involve execution of a callable unit of interest and if processing of a second test seed by the software system involves execution of a callable unit of interest, then the queue to which the first test seed is added is of higher rank than the queue to which the second test seed is added. Alternatively, in some embodiments of the second aspect, the seed addition criteria are configured so that, if processing of a first test seed by the software system involves an execution path approaching a callable unit of interest but does not involve execution of a callable unit of interest and if processing of a second test seed by the software system involves execution of a callable unit of interest, then the queue to which the first test seed is added is of lower rank than the queue to which the second test seed is added.

In some embodiments of the second aspect, the seed addition criteria are configured so that, if processing of a first test seed by the software system involves execution of, or an execution path approaching, one or more first callable units of interest and if processing of a second test seed by the software system involves execution of, or an execution path approaching, one or more second callable units of interest, then the queue to which the first test seed is added is of higher rank than the queue to which the second test seed is added if: (a) at least one of the one or more first callable units of interest has a remaining number of times to be tested greater than a remaining number of times each of the one or more second callable units of interest are to be tested; or (b) a sum of a remaining number of times each of the one or more first callable units of interest are to be tested is greater than a sum of a remaining number of times each of the one or more second callable units of interest are to be tested.

In some embodiments of the second aspect, the seed addition criterion for a first queue is that processing of the test seed by the software system involves execution of, or an execution path approaching, a callable unit of interest. Additionally or alternatively, in some embodiments of the second aspect, the seed addition criterion for a second queue is that processing of the test seed by the software system reaches a branch point in the software system that has not been reached when performing a previous test. The first queue may have a higher rank than the second queue. The ranked plurality of queues may be the set containing the first queue and the second queue.

In some embodiments of the second aspect, obtaining a seed from the highest ranked non-empty queue comprises removing the seed from the highest ranked non-empty queue.

In some embodiments of the second aspect, the testing system is arranged to determine, for the test seed, a corresponding reuse amount indicative of a number of future tests for which that seed may be used as an obtained seed. Determining, for the test seed, a corresponding reuse amount may comprise: setting the reuse amount to be a first predetermined value if processing of the test seed by the software system involves execution of a callable unit of interest; setting the reuse amount to be a second predetermined value if processing of the test seed by the software system does not involve execution of a callable unit of interest but does involve an execution path approaching a callable unit of interest; setting the reuse amount to be a third predetermined value if processing of the test seed by the software system does not involve execution of, or an execution path approaching, a callable unit of interest but does reach a branch point in the software system that has not been reached when performing a previous test. In some such embodiments, either: (a) the first predetermined value is greater than the second predetermined value, and the second predetermined value is greater than the third predetermined value; or (b) the second predetermined value is greater than the first predetermined value, and the first predetermined value is greater than the third predetermined value. Additionally or alternatively, the testing system may be arranged, for each stored seed, to store the corresponding reuse amount, wherein obtaining a seed from the highest ranked non-empty queue comprises decrementing the reuse amount corresponding to the seed and either (a) retaining the seed in the highest ranked non-empty queue and if the reuse amount corresponding to the seed is non-zero and (b) removing the seed from the highest ranked non-empty queue if the reuse amount corresponding to the seed is zero. Additionally or alternatively, adding the test seed to the highest ranked queue in the ranked plurality of queues for which the test seed meets the seed addition criterion associated with that queue may comprise adding the test seed to the highest ranked queue in the ranked plurality of queues for which the test seed meets the seed addition criterion associated with that queue a number of times equal to the reuse amount, and obtaining a seed from the highest ranked non-empty queue may then comprise removing the seed from the highest ranked non-empty queue.

In some embodiments of the second aspect, performing a mutation process on the obtained seed to generate a test seed comprises mutating the obtained seed to form the test seed.

In some embodiments of the second aspect, performing a mutation process on the obtained seed to generate a test seed comprises: (a) setting the test seed to be the obtained seed if the obtained seed is an initial seed; and (b) mutating the obtained seed to form the test seed otherwise.

In some embodiments of the second aspect, for each callable unit of the plurality of callable units, determining the target number of times that callable unit is to be tested may generate a higher target number when the one or more security vulnerability metrics indicate a higher level of security vulnerability for the callable unit.

In some embodiments of the second aspect, initializing the ranked plurality of queues comprising storing each of the one or more initial seeds in the highest ranked queue.

In some embodiments of the second aspect, the testing system is arranged to perform the sequence of tests until a termination condition is met, wherein the termination condition comprises one or more of: (a) each of queue in the ranked plurality of queues is empty; (b) a threshold number of tests have been performed; and (c) a threshold amount of time has been spent in performing the sequence of tests.

In some embodiments of the second aspect, processing of a test seed by the software system is considered to involve an execution path approaching a first callable unit if the first callable unit is reachable in a call graph for the software system from a furthest callable unit, wherein the furthest callable unit is a callable unit of the execution path for which there is no other callable unit of the execution path that is further in the call graph from a root node in the call graph and: (a) a number of callable units in the call graph between the furthest callable unit and the first callable unit is at most a predetermined threshold; or (b) a number of callable units in the call graph between the furthest callable unit and the root node is at least a predetermined threshold; or (c) an amount of code in the call graph above the furthest callable unit is at least a predetermined threshold; or (d) an amount of code in the call graph below the furthest callable unit is at most a predetermined threshold; or (e) an amount of code in the call graph between the furthest callable unit and the first callable unit is at most a predetermined threshold.

In some embodiments of the second aspect, the testing system is arranged to provide an output for the fuzzy testing based on the results generated from the performed tests.

In some embodiments of the second aspect, the software system is a software system of vehicle.

In some embodiments of the second aspect, each callable unit is a respective one of: a routine; a subroutine; a function; a procedure; a process; a class method; an interface; a component; or a subsystem of a larger system.

In some embodiments of the second aspect, the one or more security vulnerability metrics comprise one or more of: (a) a metric representing a degree of security vulnerability and/or security criticality of a callable unit; (b) a metric representing a risk that a malicious message may be passed from one callable unit to another callable unit; (c) a metric based on a number of and/or types of communication techniques used by a callable unit; (d) a metric based on a level of complexity of code of a callable unit; (e) a metric based on a number of input and output parameters of a callable function which have varying values and/or a degree to which input and output parameters of a callable function can have varying values; and (f) a metric based on historical vulnerability data relating to a callable unit.

According to a third aspect of the invention, there is provided a computer program which, when executed by one or more processors, causes the one or more processors to carry out a method according to the above-mentioned first aspect or an embodiment thereof. The computer program may be stored on a computer readable medium.

BRIEF DESCRIPTION OF THE DRAWINGS

Embodiments of the invention will now be described, by way of example only, with reference to the accompanying drawings, in which:

FIG. 2b schematically illustrates engines for implementing the framework of FIG. 2a;

FIG. 4 illustrates a sample input of OpenPilot;

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—SYSTEM OVERVIEW

Figure 1:
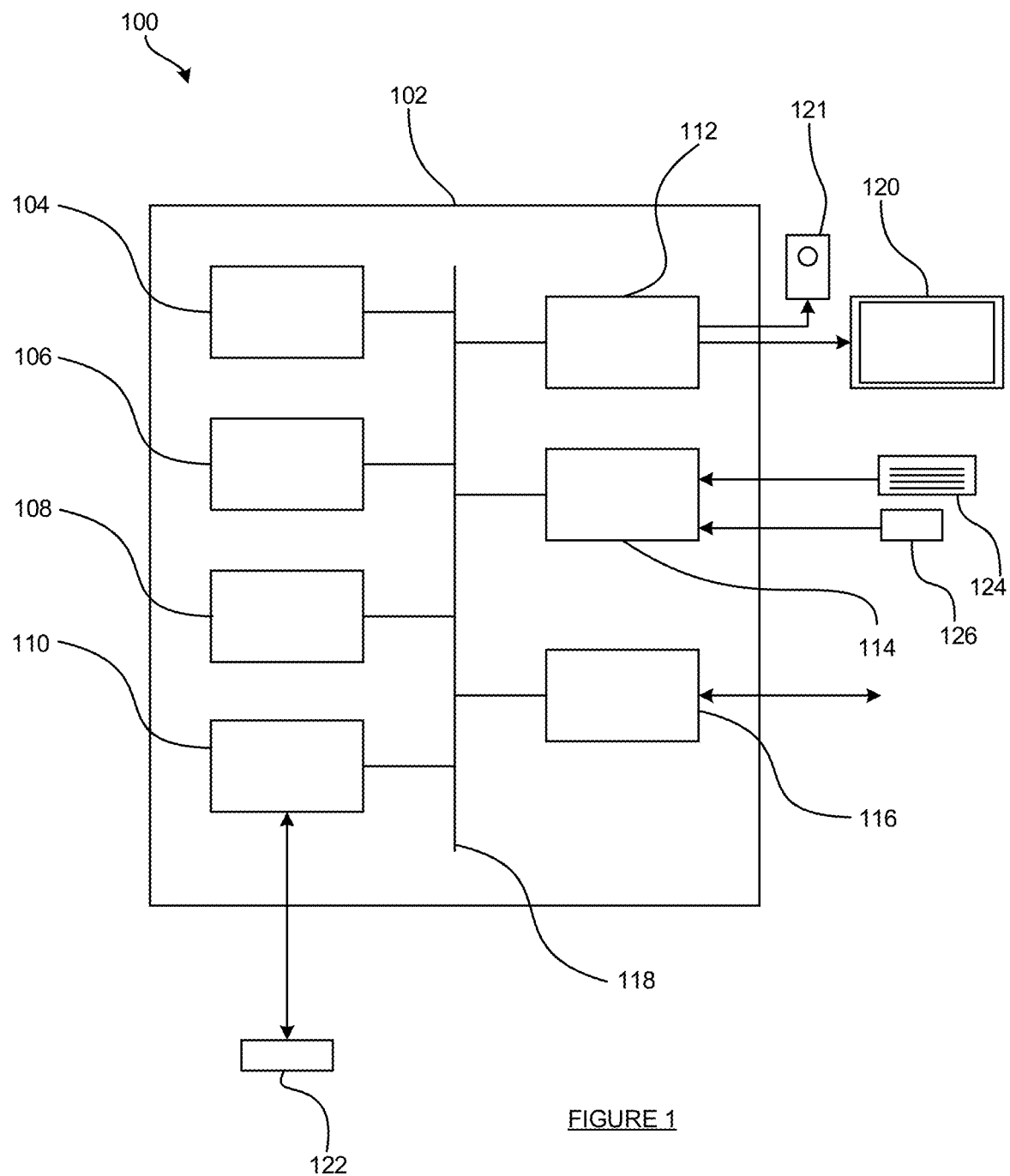
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a tablet; a laptop; etc. Additionally, it is possible that some components of the computer system 100 are not located in a personal computer, server system or a laptop and are part of a computer network connected to the personal computer, server system or a laptop via the network interface 116 or are located in a cloud of the computer network.

2—EXAMPLE EMBODIMENTS DISCUSSED IN RELATION TO VEHICLE SOFTWARE SYSTEMS 2.1—Example Framework In this section, example embodiments are discussed in the context of vehicle software systems. However, as mentioned above, it will be appreciated that the techniques and issues discussed herein are applicable more broadly to other types of software system, and that embodiments of the invention are not limited to just software system for controlling (at least in part) operation of a vehicle.

Vehicle software systems are complex software systems that rely on numerous technologies to operate and offer intelligent functionalities. Grey-box fuzzy testing can evaluate a software component's security using an extensive set of input combinations. Some embodiments of the invention provide a vulnerability-oriented fuzzy testing framework (referred to herein simply as the "framework") that validates a vehicle software system's security with numerous valid inputs that strive for a thorough examination of its vulnerable components. The framework guides the testing towards the system's most vulnerable (or weak) components by leveraging security vulnerability metrics that target vehicle software systems' challenges. Using the system's source code, the framework employs the metrics to automatically identify the weak or vulnerable functions of the system and assign corresponding weights (w) to the functions based on the metric value(s). The higher the vulnerability score, the more security fragile the component, and hence the higher the value of w. The framework gives high priority to weak functions, and intensively examines them. Unlike other grey-box techniques, the framework cares not only about coverage but also about the number of times a weak component is traversed (i.e. executed, at least in part, as part of the testing). The weight assigned to functions identifies the threshold of testing. The framework may be given a sample of good inputs (i.e. inputs known to be valid for the software system) to generate a range of valid test cases. The framework runs each test case to monitor if it traverses a weighted function or if it has a connection to one. Such test cases permit validating vulnerable components, so they are transferred to a high priority queue to create more test cases. In contrast, less attention is given to test cases that do not cover weak functions.

Figure 2A:
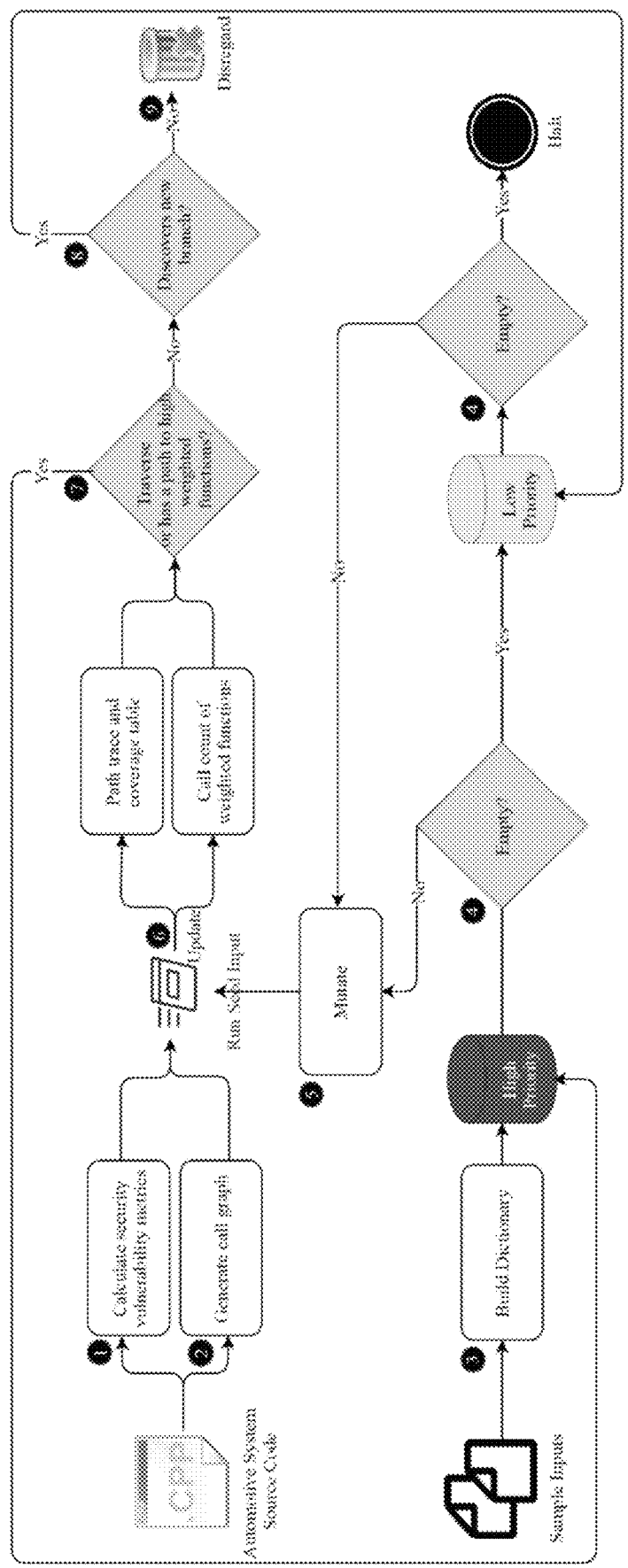
FIG. 2a schematically illustrates framework steps according to some embodiments of the invention.
Figure 2B:
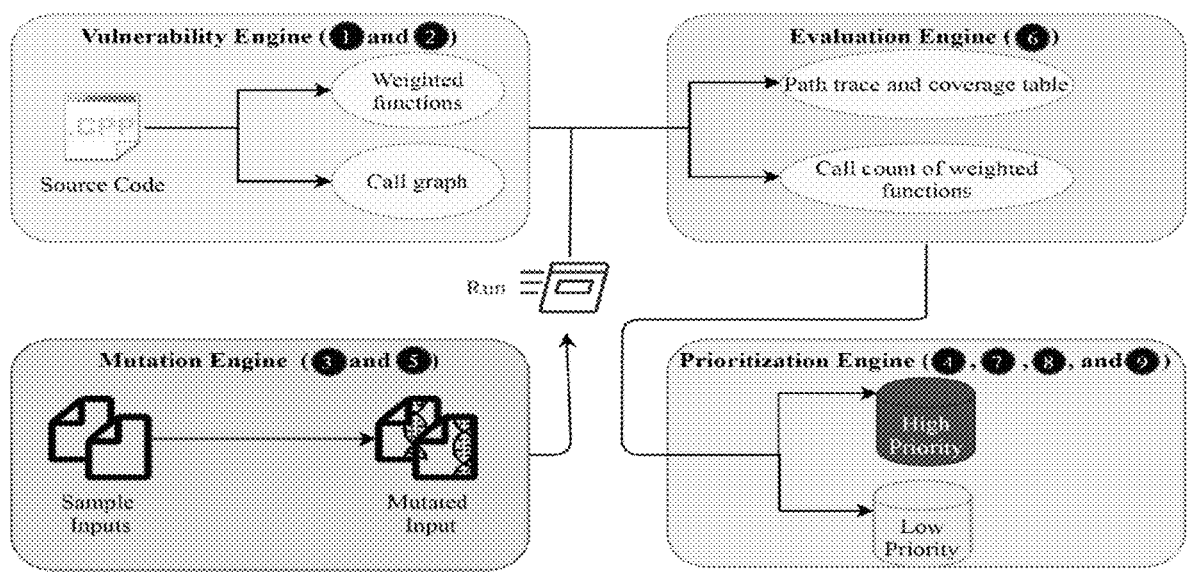

FIGS. 2a and 2b together illustrate the framework. FIG. 2a illustrates the framework steps, which, in some embodiments, may be automated by four engines illustrated in FIG. 2b: a vulnerability engine, a mutation engine, an evaluation engine, and a prioritization engine. The vulnerability engine measures functions' vulnerability value. The mutation engine generates a range of valid inputs to examine/test the software system. The evaluation engine assesses the usefulness of test cases. Finally, the prioritization engine prioritizes the testing toward weaker components. It will be appreciated, however, the embodiments of the invention may be implemented in different ways, and that the use of these four engines, with the functionality distributed amongst those four engines as set out above, it merely an example.

Reference is now made to FIG. 2a. The preparation for the fuzzing routine (steps 1, 2, and 3) may be run at compilation time, so as to minimize the overhead during the security testing phase. At step 1, the framework calculates a security vulnerability value of each component using the source code of the software system and assigns weights (w) to vulnerable functions. At step 2, the call graph of the software system is generated. At step 3, using sample inputs, the framework may build a dictionary to identify the input format for the software system. In this embodiment, two queues are used (a high priority queue and a low priority queue) are used—these queues may be initialized by adding these sample inputs (or initial seeds) to the high priority queue.

The rest of the steps (steps 4 to 9) may be viewed as a fuzzing routine, as depicted in Algorithm 1.

---
Algorithm 1 Fuzzy Routine
---
while HighPriority ≠ ∅ & LowPriority ≠ ∅ do
    if HighPriority ≠ ∅ then
        seed ← ChooseNext(HighPriority)
    else
        seed ← ChooseNext(LowPriority)
    end
    seed* ← Mutate(seed)
    if seed* IsVulnerableInteresting then
        add seed* to HighPriority
    else if seed* DiscoversNewBranch then
        add seed* to LowPriority
    else
        seed* ← ∅
    end
end

---

The routine is initiated during the security testing phase. At step 4, the framework begins by selecting a seed input from the high priority queue. If the high priority queue is empty, then the low priority queue is activated. If both queues are empty, the process terminates. At step 5, the selected seed is mutated, and the software system is executed with the mutated seed as a new input. At step 6, the framework updates a coverage table (i.e. a table indicating which functions have been called or executed (at least in part)) and a call count of weighted functions based on the seed execution. According to the results, the framework prioritizes the testing. In particular, at step 7, the framework adds the mutated input to the high priority queue if the test case traverses or has a path to a vulnerable function with a call count less than the assigned weight; whereas at step 8, the vulnerability-oriented fuzzy testing framework adds the mutated input to the low priority queue if it does not satisfy the high priority queue requirements but discovers at least one new branch; whereas at step 9, if the conditions of both queues are not satisfied, the mutated seed is discarded.

As shown in FIG. 2b, the vulnerability engine is responsible for identifying the system's functions' likelihood to have vulnerabilities and building the call graph.

The vulnerability engine may create the call graph at compilation time since it is needed by the evaluation engine (discussed in more detail below) to direct the testing toward the vulnerable functions. The call graph (CG) of a software system (or component (C)), has a set of nodes (N) representing the total number of nodes in CG. Each node in CG represents a function and a directed edge between two nodes (n→n*) demonstrates the possibility of traversing from function n to function n*.

The second role of the vulnerability engine is achieved by adopting one or more security metrics designed to identify software systems' vulnerabilities. The metrics may target the systems' uniqueness and heterogeneity to reflect its architecture and expose vulnerabilities more accurately.

The vulnerability engine may take as an input the source code of the software system and automatically analyze the source code using the one or more security metrics to identify the functions which pose a high risk on the system. If a component is outsourced, the metrics can run at the developing company. It is preferable to test high-risk functions thoroughly to expose the system's faults at an early stage.

Existing grey-box testing techniques strive solely to expand code coverage without differentiating weak system functions. Nevertheless, it is essential to examine certain functions many times. For example, consider the script presented in Listing 1 below:

Listing 1:
   result=0
   if x>=0:
   result=100/x

If x is assigned a value greater than 0, this script operates normally. Nevertheless, when x holds a value of 0, this script raises an exception. Hence, coverage is not sufficient enough to expose some bugs in the software system. Simultaneously, it is infeasible to test all the software system's functions several times within a specific time frame. The security metrics guide the framework towards the functions that require special treatment and intensive testing to maximize bug disclosure at an early stage. The higher the value of the overall security vulnerability metric for a function, the more risk it poses. According to the security vulnerability of a function, a weight w may be assigned that represents the number of times a function has to be tested.

The security vulnerability of a function F in the vehicle software system may be calculated using one or more security vulnerability metrics in a variety of ways. For example, a single security vulnerability metric may be used. Alternatively, the security vulnerability of function F may be calculated as a weighted sum of a plurality of security vulnerability metrics, such as according to Equation 1 below. It will be appreciated that the security vulnerability of a function F may be calculated in other ways.

$$SV(F) = \alpha\left(\frac{ECR(F)}{MAX(ECR)}\right) + \beta\left(\frac{CR(F)}{MAX(CR)}\right) + \gamma\left(\frac{CXR(F)}{MAX(CXR)}\right) + \delta\left(\frac{DR(F)}{MAX(DR)}\right) + \theta\left(\frac{HIST(F)}{MAX(HIST)}\right)$$

Equation 1

To prioritize the functions based on their vulnerability value, each parameter (i.e. each value generated by a security vulnerability metric) may be divided by the maximum value achieved by the same security vulnerability metric on all the function.

ECR(F) represents ECU coupling risk of function F. ECR measures the risk posed by ECU's coupling that can permit a malicious message to propagate from one vulnerable component to another in the system. ECR(F) is determined by counting the number of ECUs in F coupled to other ECUs in the system. More details on ECR, including how it may be calculated, can be found in section III.A of [67].

CR(F) represents the communication risk of function F. CAVs utilize different means of communication that expose the vehicle to various kinds of threats [64]. CR uses weights for communication means defined by security engineers based on the communication means' criticality. Then, CR(F) may be calculated by identifying the set of communication means employed by F. More details on CR, including how it may be calculated, can be found in section III.B of [67].

CXR(F) represents the complexity risk of function F. Complex code is challenging to develop and maintain, which increases the likelihood of vulnerabilities. CXR(F) may be defined as a combination of Source Line of Code (SLOC) and Nesting complexity of F. More details on CXR, including how it may be calculated, can be found in section III.C of [67].

DR(F) represents the risk associated with fluctuating inputs and outputs of function F that, if not well tested, can be a window for attackers to breach the system. DR(F) may be evaluated by identifying the sets of fluctuating inputs, fixed inputs, fluctuating outputs, and fixed outputs. Since fluctuating inputs and outputs poses a higher risk, weights may be added to these sets. More details on DR, including how it may be calculated, can be found in section III.D of [67].

HIST(F) expresses the history of security issues of F. Functions that previously contributed to an attack's success need to be re-evaluated and tested to guarantee proper security. HIST(F) may be calculated by counting the attacks that affected F. HIST may also utilize the forgetting factor to give more importance to recent attacks that might not have been addressed yet. More details on HIST, including how it may be calculated, can be found in section III.E of [67].

The weights for the weighted sum (i.e. $\alpha$, $\beta$, $\gamma$, $\delta$, $\theta$ in the above example Equation 1) may be set by a user according to the user's perceived relative importance of the metric or according to a particular goal (e.g. if the aim of the testing is to specifically check for certain types of vulnerability). Alternatively, the weights for the weighted sum (i.e. $\alpha$, $\beta$, $\gamma$, $\delta$, $\theta$ in the above example Equation 1) may assume respective predetermined values.

The weight w for a function F, i.e. the target number of times that function F is to be tested, may then be determined based on the security vulnerability calculated for the function F. For example: the weight may be proportional to the calculated security vulnerability value; various bands of possible values for the security vulnerability may be set, each having an associated target number, with the weight for the function F being set to the target number associated with the band in which F's security vulnerability value falls; etc.

As an example, in one embodiment:
$\alpha=7$;
$\beta=1$;
$\gamma=1$;
$\delta=2$;
$\theta=4$; and
the weight w may be calculated as:
  i. if the calculated security vulnerability value is above 6, then w=100
  ii. if the calculated security vulnerability value is above 2.5 but below 6, then w=50
  iii. otherwise w=0

It will be appreciated that other sets of weights, and other methods for calculating the weight w could be used. For example, the weight w could be set to 0 if the calculated security vulnerability value is less than 1, and to a predetermined positive value otherwise.

As mentioned above, the mutation engine may mutate a seed obtained from one of the queues to generate a test seed to be provided as an input to the software system. In some embodiments, the mutation engine may also aim to generate test seeds that pass any validation criteria of automotive components to expand code coverage. Automotive components communicate via the CAN or Flexray buses. Random mutation of the communication messages can fail the security testing at the data validation step, leaving the code's crucial parts without any validation. The mutation engine of AFL, for example, performs a small bit-level mutation on good inputs to generate a range of seed inputs. AFL is designed for compact data formats, e.g., multimedia files, images, and compressed data [62]. Bit-level mutation presents some critical limitations when applied to systems that are format-specific like vehicle software systems [63]. Though a bit-level mutation introduces a minor change that barely affects the input, the mutation can ruin the input structure. Moreover, bit-level mutation fails to preserve input data types. To overcome these challenges, in some embodiments, the mutation engine may adopt an input structure-aware mutation approach composed of three major components: (1) input format, (2) datatype-based mutation, (3) crossover-based mutation. Before starting the fuzzing routine, the input format may be identified. Then the framework passes seed-inputs to the mutation engine to perform datatype-based mutation. After finalizing the fuzzing process with the datatype-based mutation, the mutation engine switches to crossover-based mutation to find good test cases and expand the code coverage—for example, the crossover-based mutation may be performed on a seed obtained from a queue instead of, or in addition to, datatype-based mutation periodically (e.g. once every $n^{th}$ seed obtained from a queue, for some positive integer n).

For the input format, several solutions have been proposed to reduce dropped messages and make the mutation structure-aware, including: taint-based mutation, input parsers, and dictionaries [68]. Taint-based fuzzers require extensive code analysis that increases the overhead testing [69]. Input parsers adopted by grey-box fuzzers are used to identify input structures, guiding the mutation towards data chunks, and preserving essential file headers. Nevertheless, these input parsers work best on media files, video files, and web files [63]. Thus, preferably, the mutation engine utilizes a dictionary for preserving the input format. Dictionaries are a robust technique broadly used to feed the fuzzer information about the inputs, improving fuzzing efficiency [62], [70]. The vulnerability-oriented dictionary marks the file header and prerequisites fields essential to prevent inputs from dropping. Techniques for input format learning and compliance are well-known, and shall not be discussed further herein—embodiments of the invention may make use of any such techniques (although this is optional).

After identifying the input format, the mutation engine attempts to identify the data field types automatically. This step enables performance of data type-based mutations, which helps the seed inputs pass the initial validation steps and explore the system. Such a mutation technique triggers more bugs than random mutation as it smartly preserves the structure of the input and, at the same time, validates the system with a different input range [71].

In some embodiments, for each seed input, the mutation engine performs one mutation operation on one field. Preferably, small mutations are performed, so as to keep the majority content of seeds that helped explore the system and test vulnerable components. The mutation engine may first try to parse the field to be mutated to a data type, e.g., numeric, Boolean, and string. According to the data type, a set of operations can be performed. For numerical data, the mutation engine is may randomly choose one of the following mathematical operations: subtraction, multiplication, division, and addition. For a given numerical field X, an arbitrary numerical field Y is generated to randomly apply one of the mathematical operations (e.g. the mutated field is X+Y if the randomly chosen operation is addition). The mutation engine may mutate Boolean data to either true or false, e.g. to the opposite of that field's current Boolean value. As for strings, the mutation engine may perform single bit random deletion, insertion, or flipping. If the mutation engine fails to identify the data field type, it may perform random one-bit mutation [62]. Moreover, to test the system's input validation routine, the mutation engine may mutate fields with different data types (e.g., a numerical field is mutated to string). Nevertheless, in some embodiments such validation is only performed once for each field to avoid halting at the validation process and to explore the system.

As mentioned, crossover-based mutation may also be used. Several grey-box fuzzers are known to use this type of mutation [62], [63], [72]. Some embodiments involve statically swapping chunks of different seeds to preserve the input structure. Given a seed s, this may involve randomly choosing a portion p, where p1 and p2 are the start and end indexes of this portion. Using the same indexes, another portion p* is sliced from a random seed s*. Portion p is then placed in the position of p* in s* and p* is placed in the position of p in s, generating two new seeds. The location of the swapped portion is preserved to maintain the format of seeds.

Techniques for seed mutations are well-known, and shall not be discussed further herein—embodiments of the invention may make use of any such techniques.

The framework may be is guided towards vulnerable components and coverage expansion. The evaluation engine helps in achieving this objective by monitoring the performance of seed inputs.

For each test seed input to the software system for testing, the evaluation engine may record the traversed edges of the call graph. It may utilize lightweight instrumentation to detect branch coverage. Branch coverage offers substantially more insight into the execution path than statement coverage. It can identify the branches of conditional statements that cannot be recognized with simple statement coverage [73]. Coverage assists the fuzzer to understand the system state and to identify the usefulness of a test seed input.

Figure 3:
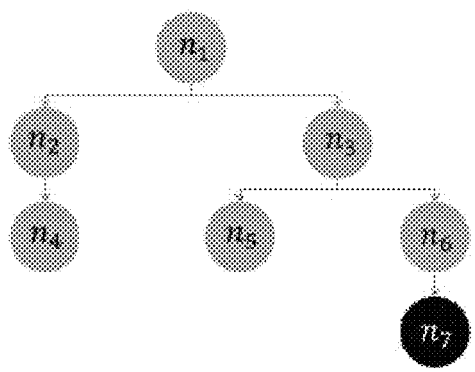
FIG. 3 illustrates an example call graph.

To successfully direct the fuzzer towards vulnerable components, the evaluation engine may detect the seed inputs that traverse, or have a path to (or approaching) a vulnerable function. Using the weighted function created by the vulnerability engine, the evaluation engine identifies the vulnerable functions and monitors the test cases that traverse them. The framework gives high importance to vulnerable functions and strives to validate their security thoroughly. Hence, even if a seed input is not traversing a vulnerable function, the evaluation engine examines whether this seed input can eventually reach the vulnerable functions. Inputs that traverse nodes connected to the vulnerable functions have a chance with a slight mutation to reach the vulnerability. The call graph generated by the vulnerability engine may be used to determine whether an executed input has a path that can reach a vulnerable function, excluding the system entry point. An example call graph is illustrated in FIG. 3. Given the call graph of FIG. 3, which has one vulnerable function $n_7$, a seed input has a path to $n_7$ only if it traverses nodes $n_3$ or $n_6$. For example, consider a seed input $s_1$ that crosses nodes $n_1$, $n_2$, and $n_4$. Seed $s_1$ is unlikely capable of reaching node $n_7$. Consequently, it may be marked as unbeneficial for testing vulnerable functions.

In complex and large systems like vehicle software systems, test case prioritization is vital during the testing and validation phase. The vulnerabilities of the system are increasing with a limited time budget. Existing grey-box fuzzy techniques do not differentiate between test cases, and they all reside in the same queue, executed in a first-come first-served (FIFO) order. On the contrary, embodiments of the present invention prioritize the test cases based on their discoveries: seeds that trigger vulnerable functions are given high priority. The prioritization engine may analyze the coverage table and weighted functions count generated by the evaluation engine to determine whether a seed input should be added to the high priority queue, low priority queue, or disregarded. More than two queues can be utilized if the security engineers need to target functions at multiple thresholds.

As discussed in the vulnerability engine, each identified vulnerable function is assigned a weight (w) to thoroughly test weak functions. Test cases that explore or have a path to vulnerable functions and whose count is less than the assigned weight are highly useful and thus added to the high priority queue. Test cases that do not execute, and do not have a path to, a vulnerable function but expand code coverage (i.e. discover a new branch that was not discovered earlier) are considered a lower priority and are moved to the low priority queue. On the contrary, test cases that do not explore new branches and do not execute (or approach) vulnerable functions are not added to any queue.

Seed inputs that join a queue may be assigned "energy values" to be further mutated and used as new inputs in the fuzzy routine. An energy value represents the number of times a seed input is mutated (i.e. a number of times that seed is to be used to generated further mutated seeds for respective separate tests). The prioritization engine adopts a constant energy assignment while giving more energy to seeds that explore vulnerable components. High priority seed inputs that traverse vulnerable components are given triple the energy of low priority seed inputs, allowing them to generate more inputs to provide a better chance for exploring vulnerable components. Seeds that belong to the high priority queue, but do not traverse a vulnerable component, are assigned double the energy of low priority seeds. Such test cases have a high chance to traverse vulnerable components, but they may never be able to reach them.

For example, consider FIG. 3, with a vulnerable node $n_7$ that has an execution count (i.e. a number of times $n_7$ has been tested) that is less than its weight. A seed s that traverses $n_7$ may assigned an energy value of 3x, where x is a constant defined by the security engineer. A seed s* that executes nodes $n_1$ and node $n_3$ (but which does not execute $n_7$) is given an energy value of 2x. Hence, to save the fuzzing power on weak functions, test cases similar to s* are assigned less energy value than those similar to s that guarantee vulnerability exploration. On the other hand, test cases that belong to low priority queues are allocated lower energy values. A seed s** that discovers edge n1→n2 for the first time, is assigned an energy value of x.

2.2—Evaluation of Example Framework

To evaluate the efficiency and performance of the framework set out in section 2.1 above, an example of its application to an automotive system, OpenPilot [74], it set out below, with compares the framework to two other fuzzing methodologies: AFL and Mutation-based fuzzer.

OpenPilot is an open-source, driving, and safety assistant system developed by comma.ai [75]. It offers SAE Level 2 driving assistance capabilities fulfilling the functions of Adaptive Cruise Control (ACC), Automated Lane Centering (ALC), Forward Collision Warning (FCW), and Lane Departure Warning (LDW). It supports various vehicle models, including Honda, Toyota, Hyundai, and Lexus. The automotive system also offers safety features by implementing Driver Monitoring (DM) functionality that warns inattentive drivers.

Such a safety-critical system requires intensive security testing to validate and verify the system's solidity against malicious behaviour. Fuzzy testing generates an array of unexpected inputs that can trigger improper behaviours in the system. OpenPilot supports a regression testing tool, Process Replay [76], that simulates the system processes and validates the output against a predefined input. To run the fuzzy testing, the tool was adjusted to accept all kinds of input. To verify the efficiency of the vulnerability-oriented fuzzy testing framework, a comparison is made against the fuzzer American Fuzzy Lop (AFL) [62] and an unguided mutation fuzzer. OpenPilot is designed using both Python and C languages. The original AFL does not support Python language, so the Python fork of AFL was used with some adjustments applied that do not affect AFL's behaviour and main functionalities but enable it to understand the OpenPilot process. To compare the efficiency of grey-box fuzzing against black-box fuzzing in the automotive system, an unguided mutation fuzzer was designed.

An embodiment of the framework was built in Python. All experiments were executed on the same machine with Intel Core i7-1065G7 processor, a four-core chip with Hyper-Threading that runs at a base frequency of 1.3 GHz, and 8 GB memory. The machine runs a 64-bit Ubuntu 16.04 Long Time Support (LTS) system.

To obtain the results, the framework and AFL were both executed until they could not discover new branches or reach vulnerable functions. Then, the unguided mutation fuzzer was run for the same number of test cases generated by the framework. To test the efficiency of the framework, four different comparisons can be made, namely the number of test cases, dropped messages, coverage, and crashes.

1) Test Case Analysis

As shown in Table 1 below, the framework generated 1,810 test cases, 808 more test cases than the ones AFL generated. The number of test cases affects the processing time. AFL finished execution within half the time consumed by the other two fuzzers. As described above, in the framework weights are assigned for vulnerable functions to undergo several validations. Hence, even if a test case does not expand the coverage but evaluates vulnerable functions, it is preserved in the queue and further mutated. On the contrary, AFL stores only the test cases that expand coverage. Thus, AFL requires fewer test cases to reach its goal.

TABLE 1

| Fuzzing Tool | Running Time | Num. of Test Cases | Num. of Dropped Cases | Num. of Conditional Branches |
|---|---|---|---|---|
| The framework | 16 hours | 1,810 | 20 | 4,812 |
| AFL | 8 hours | 1,002 | 233 | 4,809 |
| Unguided Mutation Fuzzer | 16 hours | 1,810 | 20 | 4,800 |

2) Dropped Test Case Analysis

The efficiency of the mutation engine may be examined by looking at the number of dropped messages of each testing tool. As discussed above, the mutation engine may attempt to mutate the inputs with incompatible data types to validate the system's input validation routine. Hence, the framework generated 20 dropped messages. AFL's mutation engine has remarkably more dropped messages than the framework and the unguided mutation fuzzer. Specifically, out of the 1,002 generated test cases by AFL, 233 test cases do not pass OpenPilot's input validation routine. That is 23% of the test cases compared to 1% with the other two testing tools. Automotive systems, like OpenPilot, have a stringent validation scheme, failing random mutation from becoming an efficient method to validate the security of the system.

For example, FIG. 4 outlines a sample input of OpenPilot. To determine the vehicle's health, the system takes voltage numerical value, ignition line Boolean value, controls allowed Boolean value, CAN send error numerical value, and CAN forward error numerical value as input. Seed, s, represents a good input used by the mutation engines to generate new seeds. The mutation engine of the framework performs small mutations based on the input fields, resulting in two new inputs S1 and S2 that meets the criteria and helps validate the system. AFL mutation engine performs a one-bit mutation changing 'A' in 'FALSE' to '@' in S3 and '0' to 'p' in S4. Both new inputs S3 and S4 do not meet the input validation process of OpenPilot and are dropped.

AFL wastes approximately 1.8 hours of its processing time on invalid inputs. Hence, the mutation engine of some embodiments of the framework outperforms small random mutation strategies and focuses on testing valid inputs capable of exploring the code and discovering vulnerabilities.

3) Coverage Analysis

Table 1 presents the total number of visited conditional branches. The three approaches have relatively similar branch coverage, reaching approximately 91% of the system's conditional branches. The framework has three branches hits more than AFL, and 12 hits more than the unguided mutation fuzzer. As the framework and AFL implement the same strategy to expand code coverage, it is customary to share the same coverage outcome. The framework achieved slightly better branch coverage due to the weights assigned to vulnerable functions. Mutating test cases that were not finding new branches but validating thoroughly weak components eventually generated a seed input capable of discovering new branches.

Figure 5:
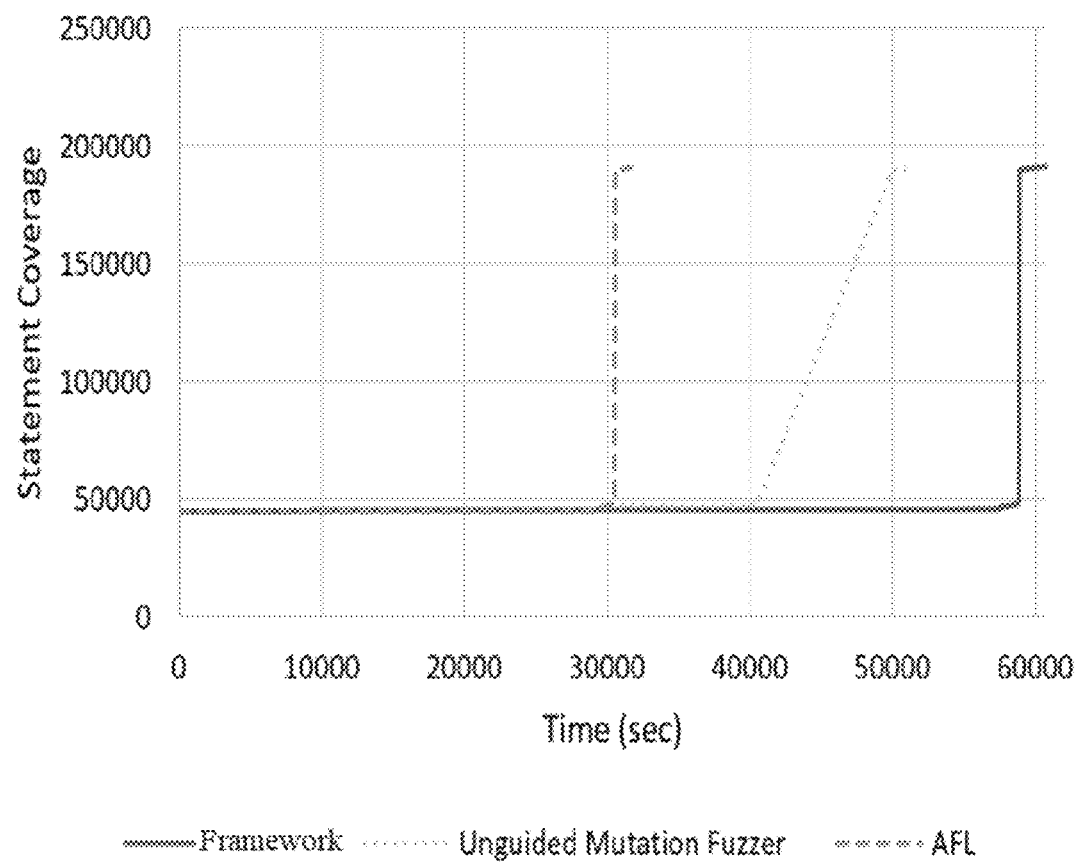
FIG. 5 is a chart plotting statement coverage curves for comparing three testing tools.

The testing tools' coverage may be explored further by analyzing the effect of weights on coverage behaviour. FIG. 5 plots the statement coverage curves of each testing tool. The statement coverage is utilized in this analysis as it gives a broad vision of the coverage. AFL reaches its optimal coverage in 6 hours, while the framework takes 15.5 hours. In the first 15.5 hours, the framework prioritizes the search and evaluation towards vulnerable components and not coverage expansion. Once comprehensive testing of high priority functions is completed, the fuzzer switches to low priority testing. The main objective is to expand coverage at this stage, which is achieved quickly by the framework since the test cases that help expand the coverage were being saved in the low priority queue and not disregarded.

While AFL's coverage plot and that of the framework are similar in shape, the unguided mutation fuzzer has a different form. That fuzzer gradually reached its optimal coverage compared to a sharp increase in coverage in the other tools. This difference highlights the importance of testing guidance. The unguided mutation fuzzer attempts to validate the system randomly. Being unaware of the testing performance, the fuzzer cannot identify exceptional test cases that traverse the system. After wasting more than 11 hours looping around the same functionalities, the fuzzer randomly hits more statements.

4) Crash Analysis

Figure 6:
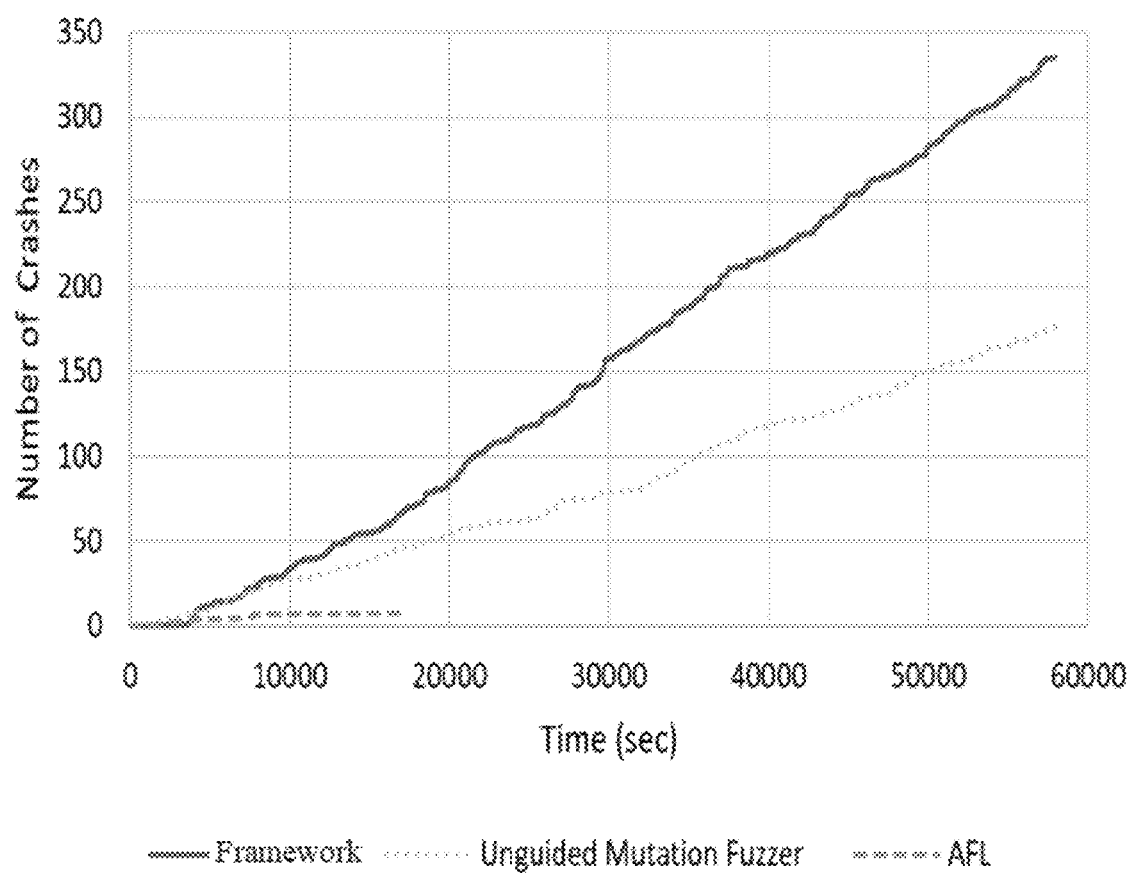
FIG. 6 is a chart depicting crashes triggered by the three testing tools.

FIG. 6 depicts the crashes triggered by the three testing tools. Crashes are exceptions raised by the automotive system due to unexpected behaviour. The majority detected by the testing tools are index out of bound exceptions. For example, the software system expects the radiator fan speed to be between 0 and 65,535 RPM. Any greater value causes the system to crash.

As shown in the graph, the number of crashes identified by the framework exceeds the crashes recognized by the AFL and unguided mutation fuzzer. The framework achieved in detecting a total of 335 crashes. FIG. 6's plot shows an exponential increase in the number of discovered crashes by the framework. Consistently, the framework finds crashes during the first 15.5 hours of testing. At that time, the fuzzer was maintaining the test cases that traverse weighted functions. This is reflected in FIG. 5 with a steady coverage plot performing a thorough evaluation of weak functions.

The unguided mutation fuzzer attained a total of 176 crashes. The mutation engine and the number of generated test cases heightened the testing tool's performance and enabled it to find more crashes than AFL. The random fuzzer was intentionally run for 1,810 test cases to assess the importance of grey-box testing in the vehicle industry. This gives the fuzzer a fair chance to find crashes. Still, the framework discovered 90% more crashes than this black-box testing method. The effectiveness of the mutation engine certainly boosted the performance of black-box validation. The fuzzer did not waste time on invalid input; 99% of the tests run were successful. A random black-box fuzzy testing technique would have less effective results, attempting to create arbitrary inputs not accepted by the automotive systems.

AFL has poor performance in terms of discovered crashes. AFL detected eight crashes in the first 4.5 hours. As discussed earlier, AFL's mutation engine has a works well on media files. However, it is less efficient with a complex system that incorporates a robust input validation mechanism. Testing hours are wasted on invalid inputs that do not evaluate the system and seek crash identification. AFL achieves its coverage peak relatively quickly. Nevertheless, this affects the number of detected crashes. As shown in FIG. 5, during the first 4.5 hours, the fuzzer was still attempting to expand coverage but hitting vulnerable functions. Once AFL increases the coverage, fewer crashes are discovered.

Figure 7:
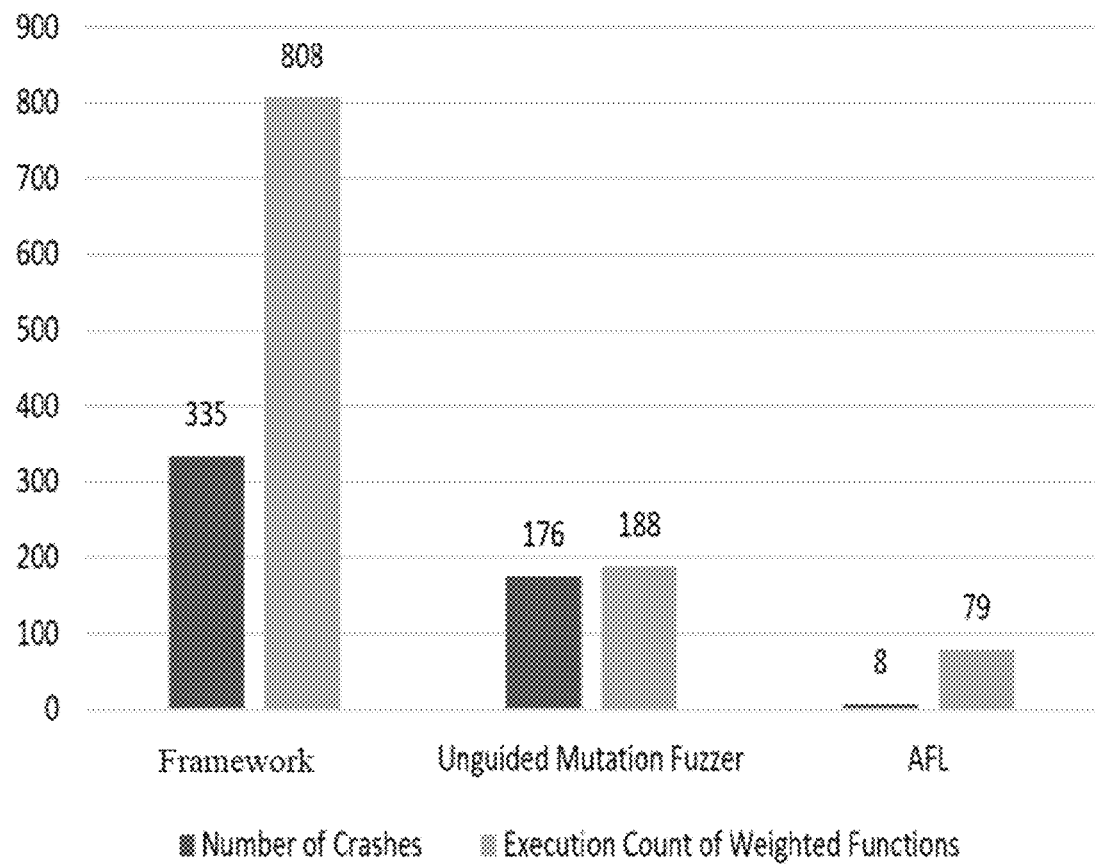
FIG. 7 is a chart comparing the number of detected crashes to the number of times weak components are tested for the three testing tools.

The relationship between weighted functions and crashes may be investigated further. The chart of FIG. 7 compares the number of detected crashes to the number of times weak components are tested for the three testing tools. The framework uses security vulnerability metrics to identify the system's weak components. A thorough evaluation of these components is achieved by assigning weights. The framework examines the weak components at least 808 times compared to 188 times for the unguided mutation fuzzer and 79 times for AFL. As shown in the chart of FIG. 7, the more the vulnerable components are tested, the higher the number of discovered crashes. AFL has a lower number of execution count of weighted functions, which is reflected in the number of discovered crashes. On the contrary, the framework's exhaustive evaluation of vulnerable components enhanced its crash detection power. This confirms the importance of security metrics and weight assignments. The security metrics direct the testing toward complex functions that are more prone to bugs. The weights assignment gave the framework a chance to examine these components more and identify vulnerabilities.

Figure 8:
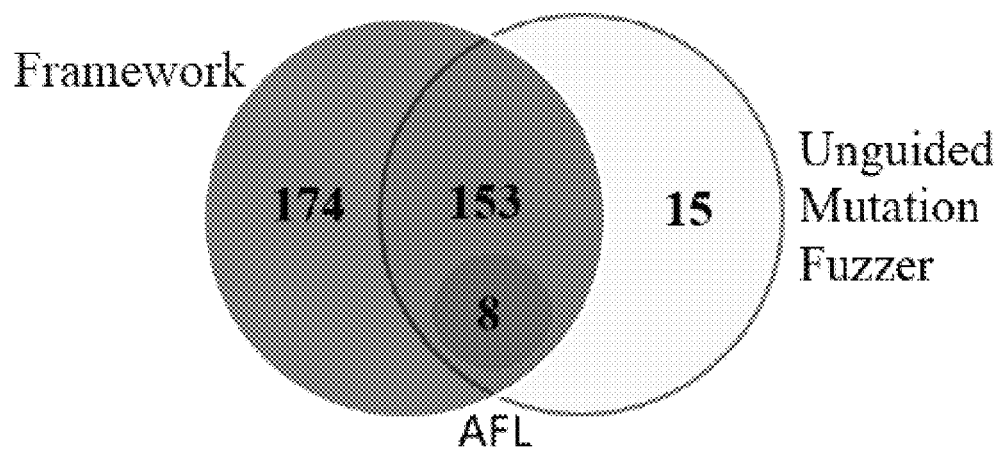
FIG. 8 is a Venn diagram showing similarities between the three testing tools' reported crashes.

The Venn diagram of FIG. 8 depicts the similarities between the three testing tools' reported crashes. The framework identifies all the crashes recognized by AFL and 153 crashes of the total unexpected behaviour found by the unguided mutation fuzzer. The framework does not identify only 15 of the crashes found by the mutation-based fuzzer, or 4% of the total, while finding 90% more crashes.

2.3—Conclusions for Example Framework

Building a vehicle capable of driving, sensing the surrounding environment, and entertaining passengers safely and reliably requires incorporating about 100 million code lines, dozens of electronic devices, and several advanced technologies into one system, exposing the vehicle to numerous potential cyberattacks. Static code analysis, dynamic program analysis, vulnerability scanning, penetration testing and fuzzy testing are security assurance methods that can aid OEMs and suppliers during Vehicle Software Engineering (VSE) to assure the system's security. Nevertheless, the vehicle industry is confronting some challenges that continue to make security testing a daunting job. These challenges include: system complexity and size, outsourcing, input and output fluctuation, and test-bed complexity.

Black-box fuzzy testing is one tool that has been proposed to mitigate these challenges. However, black-box fuzzing's naivety makes it an unreliable testing tool, leaving the critical system with minimum security resilience assurance. White-box fuzzy testing can offer a more reliable security testing tool. Nevertheless, considering the system's size, white-box testing becomes a time-consuming job that is difficult to manage within strict project deadlines.

The vulnerability-oriented grey-box fuzzy testing framework discussed above overcomes black-box testing limitations by acquiring some knowledge about the system without causing overhead that white-box testing causes. In contrast to black-box fuzzers that blindly verify the system, the framework utilizes security metrics to supervise and guide the testing. The security metrics quantitatively measure the vulnerability of components within a vehicle software system. Such an estimation may reflect the code complexity and identify the weak integration that can be violated by an attacker. According to the vulnerability value, each component is assigned a weight, representing the number of times a component should be tested. A thorough examination of weak functions can boost the vulnerability detection and assure a secure system. The framework monitors the coverage of seed inputs to achieve its goal and prioritize the testing. To strengthen the grey-box fuzzer performance, the mutation engine may be configured to generate various test cases that comply with the automotive system's input structure by inferring the inputs' data types.

The framework can be seen to offer a reliable security testing tool that does not increase testing complexity but intelligently and efficiently identifies weak functions to focus on them. Moreover, prioritizing the testing can aid security engineers to manage the security testing in time-limited projects automatically.

3—GENERAL DISCUSSION

More generally, embodiments of the invention provide a method of fuzzy testing a software system, wherein the software system comprises a plurality of callable units and is arranged to receive input for the software system to process, the method comprising: determining, for each callable unit of the plurality of callable units, based on one or more security vulnerability metrics, a target number of times (or amount) that callable unit is to be tested; initializing a ranked plurality of queues, each queue for storing one or more seeds, said initializing comprising storing one or more initial seeds in a corresponding queue of the ranked plurality of queues; performing a sequence of tests, wherein performing each test comprises:

obtaining a seed from the highest ranked non-empty queue;

performing a mutation process on the obtained seed to generate a test seed;

providing the test seed as input to the software system for the software system to process; and evaluating the processing of the test seed by the software system to generate a result for the test;

wherein each queue in the ranked plurality of queues has an associated seed addition criterion and wherein performing each test comprises either (a) adding the test seed to the highest ranked queue in the ranked plurality of queues for which the test seed meets the seed addition criterion associated with that queue; or (b) discarding the test seed if the test seed does not meet the seed addition criterion associated with any of the queues in the ranked plurality of queues;

wherein the seed addition criteria are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added, wherein a callable unit is a callable unit of interest if the current number of tests that have resulted in execution of that callable unit is less than the target number of times that callable unit is to be tested.

Figure 11:
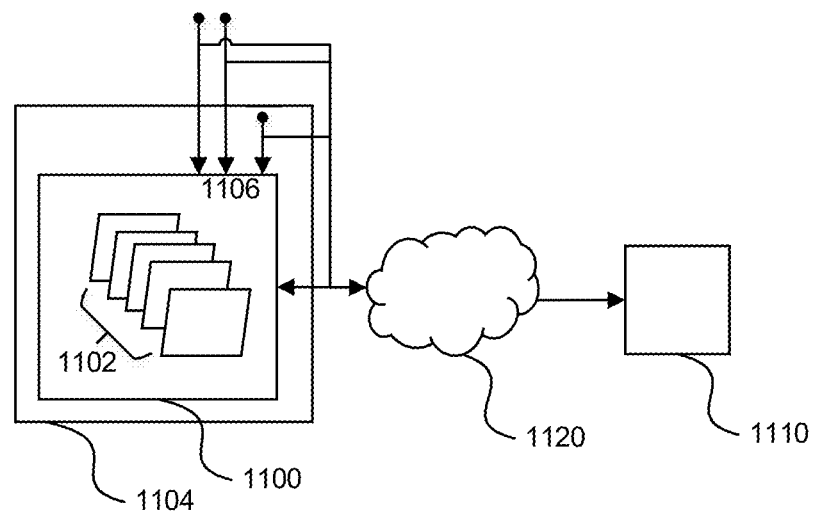
FIG. 11 schematically illustrates an example use of embodiments of the invention.

FIG. 11 schematically illustrates an example use of embodiments of the invention. As mentioned, embodiments of the invention relate to testing a software system, e.g. testing for vulnerabilities, bugs, errors, etc. The software system to be tested is illustrated as system 1100 in FIG. 11. In the example discussed in section 2 above, the system 1100 comprised the software systems (or part thereof) of, or for controlling, a vehicle—it will, however, be appreciated that the system 1100 may be for performing other functionality and/or for use in other situations/configurations. The software system 1100 comprises a plurality of "callable units" 1102—herein, each callable unit 1102 may be a respective one of: a routine; a subroutine; a function; a procedure; a process; a class method; an interface; a component; or a subsystem of a larger system. The callable units 1102 may, for example, be stored in, or as, one or more files (e.g. as source code and/or as compiled executable instructions). In the example discussed in section 2 above, one or more (potentially all) callable units 1102 are one of: ECUs, consolidates ECUs (multi-function computers) and processes. The software system 1100 may be intended for execution on/by a hardware system 1104 (e.g. one or more processors of a vehicle, as discussed in section 2 above; one or more computer systems 100 of FIG. 1 as discussed above; etc.). The system 1100 may be arranged to receive one or more inputs 1106, i.e. data to be processed. For example, the system 1100 may expose one or more interfaces for receiving input data e.g. in the form of one or more of: signals from sensors; messages from other systems/components; indications of events which have or have not taken place; data from one or more data sources (such as databases, webpages, etc.); time and/or date data from a clock; etc. Additionally or alternatively, the system 1100 may be arranged to receive responses to queries that the system 1100 issues (e.g. queries issued to servers or other devices/components). One or more of the inputs 1106 may be received/obtained from a source external to the hardware system 1106; additionally or alternatively, one or more of the inputs 1106 may be received/obtained from a source internal to the hardware system 1106 (e.g. a clock of the system 1106).

Embodiments of the invention involve performing a method of fuzzy testing a software system, such as the system 1100 of FIG. 11. Such methods may be carried out by a testing system 1110. The testing system 1110 may, for example, comprise one or more computer systems 100. The testing system 1110 may be arranged to communicate/interact with the software system 1100 via a network 1120 (although it will be appreciated that the testing system 1110 may be coupled directly to the system 1100 or may communicate with the system 1100 in other ways). Alternatively, the fuzzy testing may be carried out by the hardware system 1104 itself (so that the testing system 1110 and the hardware system 1104 are the same system). It will be appreciated that other configurations and architectures for performing the fuzzy testing are possible.

In summary, the testing system 1110 performs the fuzzy testing by simulating, or providing, test inputs 1106 for the software system 1100 to process. The result of that processing (which could just be an indication of whether or not the software system 1100 crashes or otherwise fails or exhibits a fault) may be obtained/monitored by the testing system 1110, with the result then helping to guide the formation of subsequent test inputs 1106 for the software system 1100 to process—the aim being for the test inputs to be generating so that the testing targets, or is biased towards, certain parts of the software system 1100 (i.e. generation of the test inputs aims to ensure that those certain parts of the software system 1100 are executed more often, as part of the testing, than other parts of the software system 1100).

Figure 9:
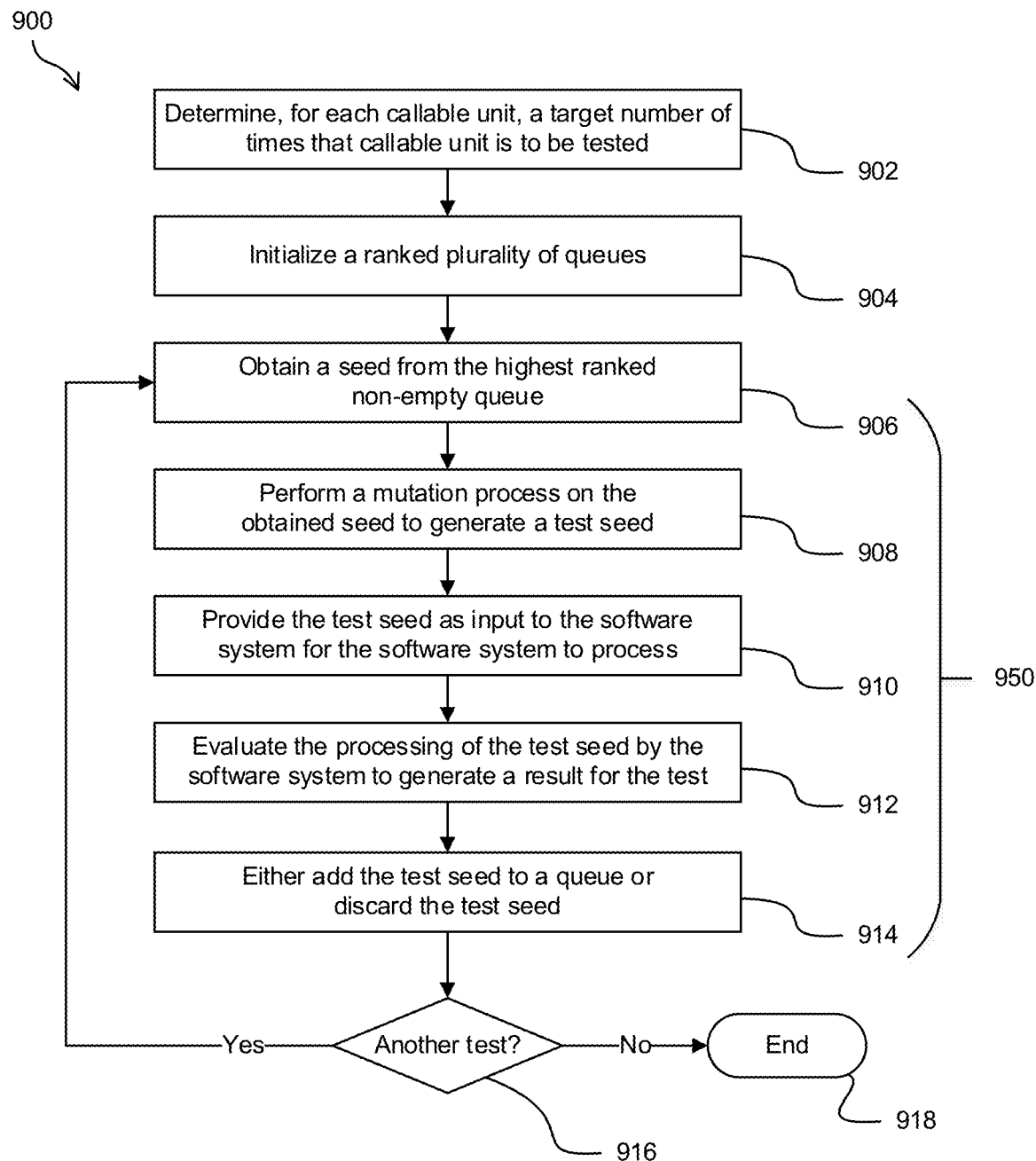
FIG. 9 is a flowchart illustrating a method according to some embodiments of the invention.
Figure 10:
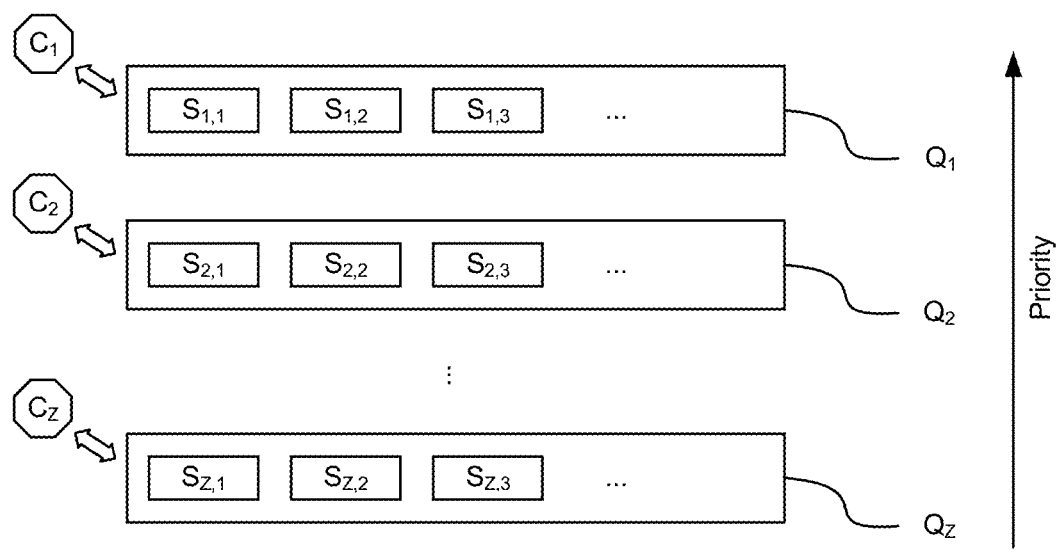
FIG. 10 schematically illustrates the plurality of ranked queues.

FIG. 9 is a flowchart illustrating a method 900 according to some embodiments of the invention. This method 900 may be carried out, for example, by the testing system 1110 of FIG. 11. Particular examples of the method 900 have been discussed above in section 2, with reference to the "framework". The example embodiment (the "framework") set out in section 2 above was described with reference to testing a vehicle software system. However, it will be appreciated that the techniques and issues discussed herein are applicable more broadly to other types of software system 1100, and that embodiments of the invention herein should not be considered limited to just software systems for controlling (at least in part) operation of a vehicle. In the example embodiment (the "framework") set out in section 2, the seed addition criterion for the high priority queue is that processing of the test seed by the software system 1100 involves execution of, or an execution path approaching, a callable unit of interest. Likewise, the seed addition criterion for the low priority queue is that processing of the test seed by the software system 1100 reaches a branch point in the software system 1100 that has not been reached when performing a previous test. However, it will be appreciated that other and/or alternative seed addition criteria could be used. For example:

The seed addition criteria may be configured so that, if processing of a first test seed by the software system 1100 involves an execution path approaching a callable unit of interest but does not involve execution of a callable unit of interest and if processing of a second test seed by the software system 1100 involves execution of a callable unit of interest, then the queue to which the first test seed is added is of higher rank than the queue to which the second test seed is added. Thus, the testing is guided, or biased, towards using seeds which almost (but have so far failed to) reach a callable unit of interest as opposed to seeds which do reach a callable unit of interest.

The seed addition criteria may be configured so that, if processing of a first test seed by the software system 1100 involves an execution path approaching a callable unit of interest but does not involve execution of a callable unit of interest and if processing of a second test seed by the software system 1100 involves execution of a callable unit of interest, then the queue to which the first test seed is added is of lower rank than the queue to which the second test seed is added. Thus, the testing is guided, or biased, towards using seeds which reach a callable unit of interest as opposed to seeds which almost (but have so far failed to) reach a callable unit of interest.

The seed addition criteria may be configured so that, if processing of a first test seed by the software system 1100 involves execution of, or an execution path approaching, one or more first callable units of interest and if processing of a second test seed by the software system 1100 involves execution of, or an execution path approaching, one or more second callable units of interest, then the queue to which the first test seed is added is of higher rank than the queue to which the second test seed is added if: (a) at least one of the one or more first callable units of interest has a remaining number of times (or amount) to be tested greater than a remaining number of times (or amount) each of the one or more second callable units of interest are to be tested; or (b) a sum of a remaining number of times (or amount) each of the one or more first callable units of interest are to be tested is greater than a sum of a remaining number of times (or amount) each of the one or more second callable units of interest are to be tested. In this way, the testing is guided, or biased, towards using seeds which reach a callable unit of interest for which more testing has still to be performed than other callable units of interest.

In general, then, wherein the seed addition criteria $C_k$ ($1 \leq k \leq Z$) are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added. As discussed above, this may be achieved by a variety of combinations of, and a variety of numbers of, seed addition criteria.

At a step 916, a determination is made as to whether or not another test 950 should be performed. If another test 950 is to be performed, then processing returns to the step 906 so that another test 950 may be performed; otherwise, processing continues at a step 918.

In some embodiments, such as the above-described example embodiment (the "framework"), the testing keeps going until both the high priority queue and the low priority queue are empty. However, it will be appreciated that other criteria for terminating the testing may be used instead. Thus, in some embodiments, the sequence of tests is performed until a termination condition is met, where this termination condition is checked at the step 916. For example, the termination condition may comprises one or more of: (a) each of queue in the ranked plurality of queues is empty (e.g. as discussed above for the "framework"); (b) a threshold number of tests have been performed (which may help to bring the testing to an end within a time constraint); and (c) a threshold amount of time has been spent in performing the sequence of tests (which again may help to bring the testing to an end within a time constraint). If the termination condition is met, then processing may continue at the step 918; otherwise, processing may return to the step 906 so that another test 950 may be performed At the step 918, the testing system 1110 may perform various "end-of-testing" processing. For example, in some embodiments of the invention, the testing system 1110 may provide, at the step 918, an output for the fuzzy testing based on the results/evaluations generated from the performed tests 950 (e.g. an indication of whether, or how many, crashes/vulnerabilities/errors/etc. were detected by the testing, potentially along with associated metadata as discussed above). There are various outputs that can be provided, examples of which are set out in section 2.3 above.

As discussed above for the example embodiment (the "framework"), some embodiments of the invention may make use of "energy values"; other embodiments may not. For embodiments that do not make use of "energy values", obtaining a seed from the highest ranked non-empty queue at the step 906 comprises removing the seed from the highest ranked non-empty queue—e.g. the queues act as FIFOs and seeds are added to the queues only once.

Alternatively, however, some embodiments of the invention may comprise determining, for the test seed, a corresponding reuse amount indicative of a number of future tests for which that seed may be used as an obtained seed (i.e. an energy value). This may be implemented in a variety of ways. For example, determining, for the test seed, a corresponding reuse amount may comprise: setting the reuse amount to be a first predetermined value if processing of the test seed (during the test 950) by the software system 1100 involves execution of a callable unit of interest; setting the reuse amount to be a second predetermined value if processing of the test seed (during the test 950) by the software system 1100 does not involve execution of a callable unit of interest but does involve an execution path approaching a callable unit of interest; setting the reuse amount to be a third predetermined value if processing of the test seed (during the test 950) by the software system 1100 does not involve execution of, or an execution path approaching, a callable unit of interest but does reach a branch point in the software system 1100 that has not been reached when performing a previous test. This may involve the first predetermined value being greater than the second predetermined value, and the second predetermined value being greater than the third predetermined value. For example, as set out above for the "framework", the first predetermined value may be 3x, the second predetermined value may be 2x and the third predetermined value may be x for some positive integer x—it will be appreciated, however, that other configurations for these predetermined values could be used. Alternatively, the second predetermined value may be greater than the first predetermined value, and the first predetermined value may be greater than the third predetermined value. It will also be appreciated that energy values of different levels may be associated with test seeds, and that this may be done based on one or more additional or alternative criteria (e.g. other factors ascertained when evaluating, at the step 912, the processing of the test seed).

The testing system 1110 may be implemented in a variety of ways so as to give effect to the "energy values". For example, some embodiments may, for each stored seed, store the corresponding reuse amount, so that obtaining a seed from the highest ranked non-empty queue (at the step 906) comprises decrementing the reuse amount corresponding to the seed and either (a) retaining the seed in the highest ranked non-empty queue if the reuse amount corresponding to the seed is non-zero and (b) removing the seed from the highest ranked non-empty queue if the reuse amount corresponding to the seed is zero. Alternatively, in some embodiments, adding (at the step 914) the test seed to the highest ranked queue in the ranked plurality of queues for which the test seed meets the seed addition criterion associated with that queue comprises adding the test seed to the highest ranked queue in the ranked plurality of queues for which the test seed meets the seed addition criterion associated with that queue a number of times (or amount) equal to the reuse amount, and obtaining a seed from the highest ranked non-empty queue (at the step 906) comprises removing the seed from the highest ranked non-empty queue. Both approaches would result in a test seed with a re-use (energy) value of, for example, 4 being used 4 times (either with just one instance of that seed being used 4 times before removal from the queue or with 4 instances of that seed each being used just one time before remove from the queue). It will, of course, be appreciated that other methods for achieving such energy functionality could be implemented instead.

In some embodiments, one or more of the queues may have a seed addition criterion based on the reuse amount for a seed. For example, a queue may have a seed addition criterion that indicates that only seeds with a reuse amount above a corresponding threshold may be added to that queue.

4—REFERENCES

The following material has been referred to in the above description. The entire disclosures of these materials are incorporated herein by reference in their entireties.

[1] S. Parkinson, P. Ward, K. Wilson, and J. Miller, "Cyber threats facing autonomous and connected vehicles: Future challenges," IEEE transactions on intelligent transportation systems, vol. 18, no. 11, pp. 2898-2915, 2017.

[2] Q1 2019 sees a rapid growth of automotive cyber incidents. [On-line]. Available: https://www.upstream.auto/blog/q1-2019-sees-a-rapid-growth-of-automotive-cyber-incidents/.

[3] Autosar enabling continuous innovations. [Online]. Available: https://www.autosar.org/.

[4] S. V. E. S. S. Committee et al., "Sae j3061-cybersecurity guidebook for cyber-physical automotive systems," SAE-Society of Automotive Engineers, 2016.

[5] What is the iso 26262 functional safety standard? [Online]. Available: https://www.ni.com/en-ca/innovations/white-papers/11/what-is-the-iso-26262-functional-safety-standard-.html.

[6] L. J. Moukahal, M. A. Elsayed, and M. Zulkernine, "Vehicle software engineering (vse): Research and practice," IEEE Internet of Things Journal, vol. 7, no. 10, pp. 10 137-10 149, 2020.

[7] Iso/iec 27005. [Online]. Available: https://www.iso.org/standard/43464.html.

[8] Society of automotive engineers. [Online]. Available: https://www.sae.org/.

[9] Road vehicles—cybersecurity engineering iso/sae dis 21434. [Online]. Available: https://www.sae.org/standards/content/iso/sae21434.d1/.

[10] D. Oka, "Securing the modern vehicle: A study of automotive industry cybersecurity practices," February 2019.

[11] T. Brennich and M. Moser, "Putting automotive security to the test," ATZelectronics worldwide, vol. 15, no. 1, pp. 46-51, 2020.

[12] B. Potter and G. McGraw, "Software security testing," IEEE Security & Privacy, vol. 2, no. 5, pp. 81-85, 2004.

[13] U. Drolia, Z. Wang, Y. Pant, and R. Mangharam, "Autoplug: An automotive test-bed for electronic controller unit testing and verification," in 2011 14th International IEEE Conference on Intelligent Transportation Systems (ITSC), 2011, pp. 1187-1192.

[14] Successful security tests using fuzzing and hil test systems. [Online]. Available: https://www.etas.com/download-center-files/products LABCAR Software Products/Hanser-automotive Successful-security-tests-hil-system en.pdf.

[15] S. Bayer, T. Enderle, D.-K. Oka, and M. Wolf, "Security crash test-practical security evaluations of automotive onboard it components," Automotive-Safety & Security, 2015.

[16] D. S. Fowler, J. Bryans, S. A. Shaikh, and P. Wooderson, "Fuzz testing for automotive cyber-security," in 2018 48th Annual IEEE/IFIP International Conference on Dependable Systems and Networks Workshops (DSN-W). IEEE, 2018, pp. 239-246.

[17] The fuzz on automotive cybersecurity testing. [Online]. Available: https://securitybyescrypt.com/fuzztesting/.

[18] Defensics fuzz testing. [Online]. Available: https://www.synopsys.com/software-integrity/securtiy-testing/fuzz-testing.html.

[19] D. K. Oka, A. Yvard, S. Bayer, and T. Kreuzinger, "Enabling cyber security testing of automotive ecus by adding monitoring capabilities," in Embedded SECUrity in Cars Conference, 15th Escar Europe, 2016, pp. 1-13.

[20] D. S. Fowler, J. Bryans, M. Cheah, P. Wooderson, and S. A. Shaikh, "A method for constructing automotive cybersecurity tests, a can fuzz testing example," in 2019 IEEE 19th International Conference on Software Quality, Reliability and Security Companion (QRS-C). IEEE, 2019, pp. 1-8.

[21] A. Pretschner, M. Broy, I. H. Kruger, and T. Stauner, "Software engineering for automotive systems: A roadmap," in Future of Software Engineering (FOSE'07). IEEE, 2007, pp. 55-71.

[22] Code bases. [Online]. Available: https://www.informationisbeautiful.net/visualizations/million-lines-of-code/.

[23] M. Broy, I. H. Kruger, A. Pretschner, and C. Salzmann, "Engineering automotive software," Proceedings of the IEEE, vol. 95, no. 2, pp. 356-373, 2007.

[24] D. Durisic, M. Nilsson, M. Staron, and J. Hansson, "Measuring the impact of changes to the complexity and coupling properties of automotive software systems," Journal of Systems and Software, vol. 86, no. 5, pp. 1275-1293, 2013.

[25] S. Moshtari, A. Sami, and M. Azimi, "Using complexity metrics to improve software security," Computer Fraud & Security, vol. 2013, no. 5, pp. 8-17, 2013.

[26] Y. Shin and L. Williams, "Can traditional fault prediction models be used for vulnerability prediction?" Empirical Software Engineering, vol. 18, no. 1, pp. 25-59, 2013.

[27] I. Chowdhury and M. Zulkernine, "Using complexity, coupling, and cohesion metrics as early indicators of vulnerabilities," Journal of Systems Architecture, vol. 57, no. 3, pp. 294-313, 2011.

[28] M. Broy, "Challenges in automotive software engineering," in Proceedings of the 28th International Conference on Software Engineering. ACM, 2006, pp. 33-42.

[29] S. A. Haider, G. Samdani, M. Ali, and M. Kamran, "A comparative analysis of in-house and outsourced development in software industry," International Journal of Computer Applications, vol. 141, no. 3, pp. 18-22, 2016.

[30] C. Hubmann, M. Becker, D. Althoff, D. Lenz, and C. Stiller, "Decision making for autonomous driving considering interaction and uncertain prediction of surrounding vehicles," in 2017 IEEE Intelligent Vehicles Symposium (IV). IEEE, 2017, pp. 1671-1678.

[31] P. Koopman and M. Wagner, "Challenges in autonomous vehicle testing and validation," SAE International Journal of Transportation Safety, vol. 4, no. 1, pp. 15-24, 2016.

[32] P. Koopman and M. Wagner, "Autonomous vehicle safety: An interdisciplinary challenge," IEEE Intelligent Transportation Systems Magazine, vol. 9, no. 1, pp. 90-96, 2017.

[33] Testing ecus and networks with canoel. [Online]. Available: https://www.vector.com/int/en/products/products-a-z/software/canoe/.

[34] Opal-rt testing platform for automotive simulation. [Online]. Available: https://www.opal-rt.com/automotive-overview/.

[35] Omnet++. [Online]. Available: https://omnetpp.org/.

[36] Simulation in the automotive industry. [Online]. Available: https://www.simulationx.com/industries/simulation-automotive.html.

[37] J. De Winter, P. M. van Leeuwen, and R. Happee, "Advantages and disadvantages of driving simulators: A discussion," in Proceedings of measuring behavior, vol. 2012. Citeseer, 2012, p. 8th.

[38] C. Obermaier, R. Riebl, C. Facchi, A. Al-Bayatti, and S. Khan, "Limitations of hil test architectures for car2x communication devices and applications," in ACM Computer Science in Cars Symposium, 2019, pp. 1-9.

[39] I. Pekaric, C. Sauerwein, and M. Felderer, "Applying security testing techniques to automotive engineering," in Proceedings of the 14th International Conference on Availability, Reliability and Security, 2019, pp. 1-10.

[40] A. Imparato, R. R. Maietta, S. Scala, and V. Vacca, "A comparative study of static analysis tools for autosar automotive software components development," in 2017 IEEE International Symposium on Software Reliability Engineering Workshops (ISSREW). IEEE, 2017, pp. 65-68.

[41] Bugfinder—insect search and identification tool. [Online]. Available: https://www.insectidentification.org/bugfinder-start.asp.

[42] Polyspace code prover. [Online]. Available: https://www.mathworks.com/products/polyspace-code-prover.html.

[43] Quality accelerated. [Online]. Available: https://www.qa-systems.com/.

[44] What is misra? [Online]. Available: https://www.misra.org.uk/MISRAHome/WhatisMISRA/tabid/66/Default.aspx.

[45] S. Keul, "Tuning static data race analysis for automotive control software," in 2011 IEEE 11th International Working Conference on Source Code Analysis and Manipulation. IEEE, 2011, pp. 45-54.

[46] A. G. Bardas et al., "Static code analysis," Journal of Information Systems & Operations Management, vol. 4, no. 2, pp. 99-107, 2010.

[47] Z. B. Celik, E. Fernandes, E. Pauley, G. Tan, and P. McDaniel, "Program analysis of commodity iot applications for security and privacy: Challenges and opportunities," ACM Computing Surveys (CSUR), vol. 52, no. 4, pp. 1-30, 2019.

[48] K. A. Koscher, "Securing embedded systems: analyses of modern automotive systems and enabling near-real time dynamic analysis," Ph.D. dissertation, 2014.

[49] G. Cabodi, D. F. S. Finocchiaro, and D. Montisci, "Security-oriented dynamic code analysis in automotive embedded systems."

[50] Automotive information sharing and analysis center. [Online]. Available: https://www.automotiveisac.com/.

[51] M. Ring, J. Dürrwang, F. Sommer, and R. Kriesten, "Survey on vehicular attacks-building a vulnerability database," in 2015 IEEE International Conference on Vehicular Electronics and Safety (ICVES). IEEE, 2015, pp. 208-212.

[52] F. Sommer, J. Dürrwang, and R. Kriesten, "Survey and classification of automotive security attacks," Information, vol. 10, no. 4, p. 148, 2019.

[53] K. Koscher, A. Czeskis, F. Roesner, S. Patel, T. Kohno, S. Checkoway, D. McCoy, B. Kantor, D. Anderson, H. Shacham et al., "Experimental security analysis of a modern automobile," in 2010 IEEE Symposium on Security and Privacy, pp. 447-462.

[54] M. Cheah, S. A. Shaikh, O. Haas, and A. Ruddle, "Towards a systematic security evaluation of the automotive bluetooth interface," Vehicular Communications, vol. 9, pp. 8-18, 2017.

[55] C. Corbett, T. Basic, T. Lukaseder, and F. Kargl, "A testing framework architecture for automotive intrusion detection systems," Automotive-Safety & Security 2017-Sicherheit and Zuverlässigkeit für automobile Informationstechnik, 2017.

[56] A. Taylor, S. Leblanc, and N. Japkowicz, "Probing the limits of anomaly detectors for automobiles with a cyber-attack framework," IEEE Intelligent Systems, vol. 33, no. 2, pp. 54-62, 2018.

[57] T. Huang, J. Zhou, and A. Bytes, "Atg: An attack traffic generation tool for security testing of in-vehicle can bus," in Proceedings of the 13th International Conference on Availability, Reliability and Security, 2018, pp. 1-6.

[58] H. Liang, X. Pei, X. Jia, W. Shen, and J. Zhang, "Fuzzing: State of the art," IEEE Transactions on Reliability, vol. 67, no. 3, pp. 1199-1218, 2018.

[59] D. K. Oka, T. Fujikura, and R. Kurachi, "Shift left: Fuzzing earlier in the automotive software development lifecycle using hil systems," 2018.

[60] D. S. Fowler, J. Bryans, S. A. Shaikh, and P. Wooderson, "Fuzz testing for automotive cyber-security," in 2018 48th Annual IEEE/IFIP International Conference on Dependable Systems and Networks Workshops (DSN-W), 2018, pp. 239-246.

[61] P. Wang and X. Zhou, "Sok: The progress, challenges, and perspectives of directed greybox fuzzing," arXiv preprint arXiv:2005.11907, 2020.

[62] M. Zalewski, "American fuzzy lop.(2015)," URL https://lcamfuf.corefump.cx/afl, 2015.

[63] V.-T. Pham, M. Böhme, A. E. Santosa, A. R. Caciulescu, and A. Roy-choudhury, "Smart greybox fuzzing," IEEE Transactions on Software Engineering, 2019.

[64] C. Lemieux and K. Sen, "Fairfuzz: A targeted mutation strategy for increasing greybox fuzz testing coverage," in Proceedings of the 33rd ACM/IEEE International Conference on Automated Software Engineer¬ing, 2018, pp. 475-485.

[65] M. Böhme, V.-T. Pham, and A. Roychoudhury, "Coverage-based grey-box fuzzing as markov chain," IEEE Transactions on Software Engineering, vol. 45, no. 5, pp. 489-506, 2017.

[66] G. Zhang and X. Zhou, "'aft extended with test case prioritization techniques," Int. J. Model. Optim, vol. 8, no. 1, pp. 41-45, 2018.

[67] L. Moukahal and M. Zulkernine, "Security vulnerability metrics for connected vehicles," in 2019 IEEE 19th International Conference on Software Quality, Reliability and Security Companion (QRS-C). IEEE, 2019, pp. 17-23.

[68] A. Zeller, R. Gopinath, M. Böhme, G. Fraser, and C. Holler, "The fuzzing book," 2019.

[69] P. Chen and H. Chen, "Angora: Efficient fuzzing by principled search," in 2018 IEEE Symposium on Security and Privacy (SP). IEEE, 2018, pp. 711-725.

[70] V. Wüstholz and M. Christakis, "Learning inputs in greybox fuzzing," arXiv preprint arXiv:1807.07875, 2018.

[71] V. Jain, S. Rawat, C. Giuffrida, and H. Bos, "Tiff: using input type inference to improve fuzzing," in Proceedings of the 34th Annual Computer Security Applications Conference, 2018, pp. 505-517.

[72] S. Rawat and L. Mounier, "Offset-aware mutation based fuzzing for buffer overflow vulnerabilities: Few preliminary results," in 2011 IEEE Fourth International Conference on Software Testing, Verification and Validation Workshops. IEEE, 2011, pp. 531-533.

[73] R. C. Bhushan and D. D. Yadav, "Number of test cases required in achieving statement, branch and path coverage using 'gcov': An analysis," in 7th International Workshop on Computer Science and Engineering (WCSE 2017) Beijing, China, 2017, pp. 176-180.

[74] Openpilot. [Online]. Available: https://github.com/commaal/openpilot.

[75] Comma.ai. [Online]. Available: https://comma.ai/.

[76] Openpilot process replay. [Online]. Available: https://github.com/commaal/openpilot/tree/master/selfdrive/test/process replay.

5—MODIFICATIONS

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (CPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of fuzzy testing a software system, wherein the software system comprises a plurality of callable units and is arranged to receive input for the software system to process, the method comprising:
    determining, for each callable unit of the plurality of callable units, based on one or more security vulnerability metrics, a target number of times that callable unit is to be tested;
    initializing a ranked plurality of queues, each queue for storing one or more seeds, said initializing comprising storing one or more initial seeds in a corresponding queue of the ranked plurality of queues;
    performing a sequence of tests, wherein performing each test comprises:
        obtaining a seed from a highest ranked non-empty queue;
        performing a mutation process on the obtained seed to generate a test seed;
        providing the test seed as input to the software system for the software system to process; and
        evaluating the processing of the test seed by the software system to generate a result for the test;
    wherein each queue in the ranked plurality of queues has an associated seed addition criterion and wherein performing each test comprises either (a) adding the test seed to a highest ranked queue in the ranked plurality of queues for which the test seed meets the seed addition criterion associated with that queue; or (b) discarding the test seed if the test seed does not meet the seed addition criterion associated with any of the queues in the ranked plurality of queues;
    wherein the seed addition criteria are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added, wherein a callable unit is a callable unit of interest if a current number of tests that have resulted in execution of that callable unit is less than the target number of times that callable unit is to be tested.

2. The method of claim 1, wherein the seed addition criteria are configured so that, if processing of a first test seed by the software system involves an execution path approaching a callable unit of interest but does not involve execution of a callable unit of interest and if processing of a second test seed by the software system involves execution of a callable unit of interest, then either:
    (a) the queue to which the first test seed is added is of higher rank than the queue to which the second test seed is added; or
    (b) the queue to which the first test seed is added is of lower rank than the queue to which the second test seed is added.

3. The method of claim 1, wherein the seed addition criteria are configured so that, if processing of a first test seed by the software system involves execution of, or an execution path approaching, one or more first callable units of interest and if processing of a second test seed by the software system involves execution of, or an execution path approaching, one or more second callable units of interest, then the queue to which the first test seed is added is of higher rank than the queue to which the second test seed is added if:
    (a) at least one of the one or more first callable units of interest has a remaining number of times to be tested greater than a remaining number of times each of the one or more second callable units of interest are to be tested; or
    (b) a sum of a remaining number of times each of the one or more first callable units of interest are to be tested is greater than a sum of a remaining number of times each of the one or more second callable units of interest are to be tested.

4. The method of claim 1, wherein one or both of:
    (a) the seed addition criterion for a first queue is that processing of the test seed by the software system involves execution of, or an execution path approaching, a callable unit of interest; and
    (b) the seed addition criterion for a second queue is that processing of the test seed by the software system reaches a branch point in the software system that has not been reached when performing a previous test.

5. The method of claim 4, wherein the first queue has a higher rank than the second queue.

6. The method of claim 5, wherein the ranked plurality of queues is the set containing the first queue and the second queue.

7. The method of claim 1, wherein obtaining a seed from the highest ranked non-empty queue comprises removing the seed from the highest ranked non-empty queue.

8. The method of claim 1, comprising determining, for the test seed, a corresponding reuse amount indicative of a number of future tests for which that seed may be used as an obtained seed.

9. The method of claim 8, wherein determining, for the test seed, a corresponding reuse amount comprises:

setting the reuse amount to be a first predetermined value if processing of the test seed by the software system involves execution of a callable unit of interest;

setting the reuse amount to be a second predetermined value if processing of the test seed by the software system does not involve execution of a callable unit of interest but does involve an execution path approaching a callable unit of interest;

setting the reuse amount to be a third predetermined value if processing of the test seed by the software system does not involve execution of, or an execution path approaching, a callable unit of interest but does reach a branch point in the software system that has not been reached when performing a previous test.

10. The method of claim 9, wherein either:
    (a) the first predetermined value is greater than the second predetermined value, and the second predetermined value is greater than the third predetermined value; or
    (b) the second predetermined value is greater than the first predetermined value, and the first predetermined value is greater than the third predetermined value.

11. The method of claim 8, comprising, for each stored seed, storing the corresponding reuse amount, and wherein obtaining a seed from the highest ranked non-empty queue comprises decrementing the reuse amount corresponding to the seed and either (a) retaining the seed in the highest ranked non-empty queue and if the reuse amount corresponding to the seed is non-zero and (b) removing the seed from the highest ranked non-empty queue if the reuse amount corresponding to the seed is zero.

12. The method of claim 8, wherein adding the test seed to the highest ranked queue in the ranked plurality of queues for which the test seed meets the seed addition criterion associated with that queue comprises adding the test seed to the highest ranked queue in the ranked plurality of queues for which the test seed meets the seed addition criterion associated with that queue a number of times equal to the reuse amount, and wherein obtaining a seed from the highest ranked non-empty queue comprises removing the seed from the highest ranked non-empty queue.

13. The method of claim 1, wherein performing a mutation process on the obtained seed to generate a test seed comprises one of:
    (a) mutating the obtained seed to form the test seed; or
    (b) setting the test seed to be the obtained seed if the obtained seed is an initial seed; and mutating the obtained seed to form the test seed otherwise.

14. The method of claim 1, wherein for each callable unit of the plurality of callable units, determining the target number of times that callable unit is to be tested generates a higher target number when the one or more security vulnerability metrics indicate a higher level of security vulnerability for the callable unit.

15. The method of claim 1, wherein initializing the ranked plurality of queues comprising storing each of the one or more initial seeds in the highest ranked queue.

16. The method of claim 1, wherein the sequence of tests is performed until a termination condition is met, wherein the termination condition comprises one or more of:
    (a) each of queue in the ranked plurality of queues is empty;
    (b) a threshold number of tests have been performed; and
    (c) a threshold amount of time has been spent in performing the sequence of tests.

17. The method of claim 1, wherein processing of a test seed by the software system is considered to involve an execution path approaching a first callable unit if the first callable unit is reachable in a call graph for the software system from a furthest callable unit, wherein the furthest callable unit is a callable unit of the execution path for which there is no other callable unit of the execution path that is further in the call graph from a root node in the call graph and:
    (a) a number of callable units in the call graph between the furthest callable unit and the first callable unit is at most a predetermined threshold; or
    (b) a number of callable units in the call graph between the furthest callable unit and the root node is at least a predetermined threshold; or
    (c) an amount of code in the call graph above the furthest callable unit is at least a predetermined threshold; or
    (d) an amount of code in the call graph below the furthest callable unit is at most a predetermined threshold; or
    (e) an amount of code in the call graph between the furthest callable unit and the first callable unit is at most a predetermined threshold.

18. The method of claim 1, comprising providing an output for the fuzzy testing based on the results generated from the performed tests.

19. The method of claim 1, wherein the software system is a software system of vehicle.

20. The method of claim 1, wherein each callable unit is a respective one of: a routine; a subroutine; a function; a procedure; a process; a class method; an interface; a component; or a subsystem of a larger system.

21. The method of claim 1, wherein the one or more security vulnerability metrics comprise one or more of:
    (a) a metric representing a degree of security vulnerability and/or security criticality of a callable unit;
    (b) a metric representing a risk that a malicious message may be passed from one callable unit to another callable unit;
    (c) a metric based on a number of and/or types of communication techniques used by a callable unit;
    (d) a metric based on a level of complexity of code of a callable unit;
    (e) a metric based on a number of input and output parameters of a callable function which have varying values and/or a degree to which input and output parameters of a callable function can have varying values; and
    (f) a metric based on historical vulnerability data relating to a callable unit.

22. A test system comprising one or more processors arranged to perform fuzzy testing on a software system, wherein the software system comprises a plurality of callable units and is arranged to receive input for the software system to process, the fuzzy testing comprising:
    determining, for each callable unit of the plurality of callable units, based on one or more security vulnerability metrics, a target number of times that callable unit is to be tested;
    initializing a ranked plurality of queues, each queue for storing one or more seeds, said initializing comprising storing one or more initial seeds in a corresponding queue of the ranked plurality of queues;
    performing a sequence of tests, wherein performing each test comprises:
        obtaining a seed from a highest ranked non-empty queue;
        performing a mutation process on the obtained seed to generate a test seed;
        providing the test seed as input to the software system for the software system to process; and evaluating the processing of the test seed by the software system to generate a result for the test;

wherein each queue in the ranked plurality of queues has an associated seed addition criterion and wherein performing each test comprises either (a) adding the test seed to a highest ranked queue in the ranked plurality of queues for which the test seed meets the seed addition criterion associated with that queue; or (b) discarding the test seed if the test seed does not meet the seed addition criterion associated with any of the queues in the ranked plurality of queues;

wherein the seed addition criteria are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added, wherein a callable unit is a callable unit of interest if a current number of tests that have resulted in execution of that callable unit is less than the target number of times that callable unit is to be tested.

23. A non-transitory computer-readable medium storing a computer program which, when executed by one or more processors, causes the one or more processors to perform fuzzy testing on a software system, wherein the software system comprises a plurality of callable units and is arranged to receive input for the software system to process, the fuzzy testing comprising:

determining, for each callable unit of the plurality of callable units, based on one or more security vulnerability metrics, a target number of times that callable unit is to be tested;

initializing a ranked plurality of queues, each queue for storing one or more seeds, said initializing comprising storing one or more initial seeds in a corresponding queue of the ranked plurality of queues;

performing a sequence of tests, wherein performing each test comprises:

obtaining a seed from a highest ranked non-empty queue;

performing a mutation process on the obtained seed to generate a test seed;

providing the test seed as input to the software system for the software system to process; and evaluating the processing of the test seed by the software system to generate a result for the test;

wherein each queue in the ranked plurality of queues has an associated seed addition criterion and wherein performing each test comprises either (a) adding the test seed to a highest ranked queue in the ranked plurality of queues for which the test seed meets the seed addition criterion associated with that queue; or (b) discarding the test seed if the test seed does not meet the seed addition criterion associated with any of the queues in the ranked plurality of queues;

wherein the seed addition criteria are configured so that, if processing of a first test seed by the software system involves execution of, or an execution path approaching, a callable unit of interest and if processing of a second test seed by the software system does not involve execution of, or an execution path approaching, a callable unit of interest, then the queue to which the first test seed is added is of higher rank than the queue to which the second test seed is added, wherein a callable unit is a callable unit of interest if a current number of tests that have resulted in execution of that callable unit is less than the target number of times that callable unit is to be tested.

* * * * *